US012699461B1

(12) United States Patent
Chawda et al.

(10) Patent No.: US 12,699,461 B1
(45) Date of Patent: Aug. 4, 2026

(54) DETERMINING USER INTENT DURING TWO-HANDED GESTURES

(71) Applicant: Apple Inc., Cupertino, CA (US)

(72) Inventors: Vinay Chawda, San Jose, CA (US); Chase B. Lortie, San Francisco, CA (US); Daniel J. Brewer, Redwood City, CA (US); Julian K. Shutzberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/652,206

(22) Filed: May 1, 2024

Related U.S. Application Data

(60) Provisional application No. 63/546,946, filed on Nov. 2, 2023, provisional application No. 63/466,450, filed on May 15, 2023.

(51) Int. Cl.
*G06F 3/01* (2006.01)

(52) U.S. Cl.
CPC .............. *G06F 3/017* (2013.01); *G06F 3/011* (2013.01)

(58) Field of Classification Search
CPC ... G06F 3/011; G06F 3/017; G06F 3/012–013
See application file for complete search history.

(56) References Cited

U.S. PATENT DOCUMENTS

| | | | | |
|---|---|---|---|---|
| 9,632,572 | B2 * | 4/2017 | Holz | G02B 5/045 |
| 10,261,595 | B1 * | 4/2019 | Kin | G06F 3/04815 |
| 10,642,369 | B2 * | 5/2020 | Iyer | G06V 40/11 |
| 11,422,669 | B1 * | 8/2022 | Ravasz | G06F 3/013 |
| 11,841,920 | B1 * | 12/2023 | Marsden | G06N 3/045 |
| 11,875,013 | B2 * | 1/2024 | Lemay | G06F 3/0421 |
| 12,099,653 | B2 * | 9/2024 | Chawda | G06F 3/011 |
| 12,118,200 | B1 * | 10/2024 | Shutzberg | G06F 3/0482 |
| 12,125,149 | B2 * | 10/2024 | Burton | G06V 20/20 |
| 12,175,010 | B2 * | 12/2024 | Lemay | G06F 3/011 |
| 2011/0289456 | A1 * | 11/2011 | Reville | G06F 3/017 |
| | | | | 715/830 |
| 2012/0262574 | A1 * | 10/2012 | Park | G06F 3/00 |
| | | | | 348/143 |
| 2013/0066526 | A1 * | 3/2013 | Mondragon | G06V 40/20 |
| | | | | 701/49 |

(Continued)

FOREIGN PATENT DOCUMENTS

| | | |
|---|---|---|
| CN | 113923553 | 1/2022 |

*Primary Examiner* — Patrick F Marinelli
(74) *Attorney, Agent, or Firm* — Thompson Hine LLP

(57) ABSTRACT

Devices, systems, and methods that interpret user activity, such as two hand gestures, as user interactions with virtual elements (e.g., UI elements) positioned within in a 3D space such as an XR environment. For example, an example process may include receiving data corresponding to user activity involving two hands of a user in a 3D coordinate system. The process may further include identifying actions performed by the two hands based on the data corresponding to the user activity, each of the two hands performing one of the identified actions. The process may further include determining whether the identified actions satisfy a criterion based on the data corresponding to the user activity. The process may further include determining to associate each of the actions performed by each of the two hands with a user intended action in accordance with determining that the identified actions satisfy the criterion.

22 Claims, 7 Drawing Sheets

(56)            References Cited

U.S. PATENT DOCUMENTS

| | | | | | |
|---|---|---|---|---|---|
| 2014/0337802 A1* | 11/2014 | Bertsch | | G06F 3/011 | |
| | | | | 715/848 | |
| 2015/0029091 A1* | 1/2015 | Nakashima | | G06F 3/012 | |
| | | | | 345/156 | |
| 2015/0097768 A1* | 4/2015 | Holz | | H04N 23/90 | |
| | | | | 348/47 | |
| 2015/0220149 A1* | 8/2015 | Plagemann | | G06F 3/017 | |
| | | | | 715/856 | |
| 2015/0268737 A1* | 9/2015 | Gelfond | | G06F 3/017 | |
| | | | | 345/156 | |
| 2015/0316579 A1* | 11/2015 | Pakzad | | G01C 22/006 | |
| | | | | 702/150 | |
| 2017/0090747 A1* | 3/2017 | Dash | | G06F 1/163 | |
| 2017/0228025 A1* | 8/2017 | Hall | | G06F 3/017 | |
| 2017/0322623 A1* | 11/2017 | McKenzie | | G06F 3/04886 | |
| 2017/0329515 A1* | 11/2017 | Clement | | G06F 3/011 | |
| 2018/0059925 A1* | 3/2018 | Maizels | | G06F 3/04847 | |
| 2018/0292906 A1* | 10/2018 | Kato | | H04N 5/74 | |

| | | | | |
|---|---|---|---|---|
| 2019/0279520 A1* | 9/2019 | Wilson | | G09B 19/003 |
| 2019/0346936 A1* | 11/2019 | Dash | | G06F 3/0304 |
| 2019/0377420 A1* | 12/2019 | Hoffnung | | G06F 3/0482 |
| 2021/0097776 A1* | 4/2021 | Faulkner | | G06F 3/011 |
| 2021/0191600 A1* | 6/2021 | Lemay | | G06F 3/013 |
| 2021/0286502 A1* | 9/2021 | Lemay | | G06F 3/011 |
| 2022/0084279 A1* | 3/2022 | Lindmeier | | G06F 3/04842 |
| 2022/0091722 A1* | 3/2022 | Faulkner | | G06F 3/013 |
| 2022/0091723 A1* | 3/2022 | Faulkner | | G06F 3/011 |
| 2022/0092860 A1* | 3/2022 | Clark | | G06V 10/70 |
| 2023/0094182 A1* | 3/2023 | Horowitz | | G06F 3/017 |
| | | | | 345/420 |
| 2023/0244316 A1* | 8/2023 | Schwarz | | G06N 3/08 |
| | | | | 345/156 |
| 2024/0094882 A1* | 3/2024 | Brewer | | G06F 3/0487 |
| 2024/0103613 A1* | 3/2024 | Chawda | | G06F 3/0304 |
| 2024/0103635 A1* | 3/2024 | Brewer | | G06V 40/113 |
| 2024/0385692 A1* | 11/2024 | Shutzberg | | G06F 3/017 |
| 2024/0402800 A1* | 12/2024 | Shutzberg | | G06F 3/013 |
| 2025/0004545 A1* | 1/2025 | Wang | | G06F 3/013 |
| 2025/0036255 A1* | 1/2025 | Pastrana Vicente | | G06F 3/013 |

* cited by examiner

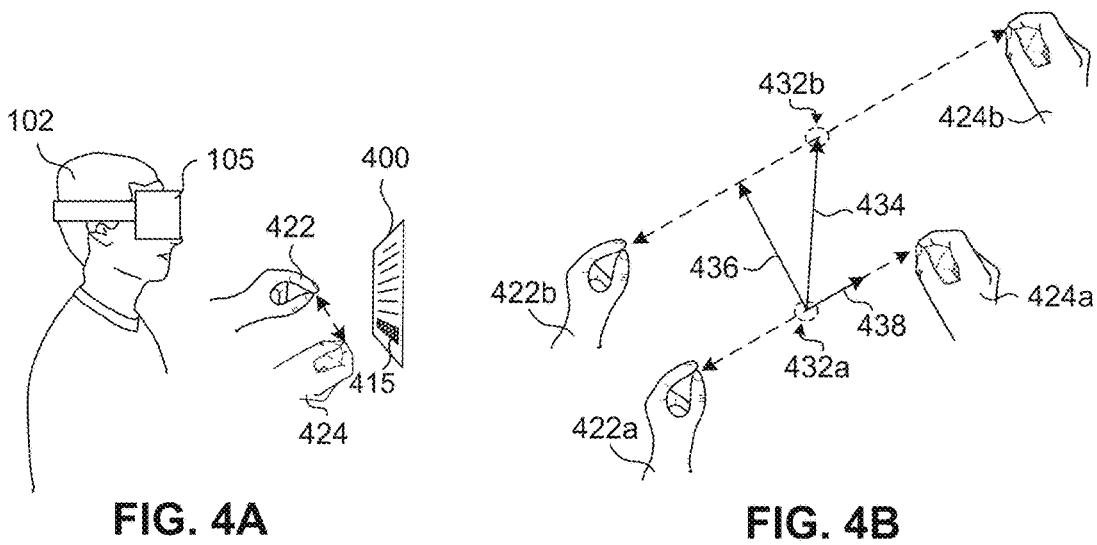
FIG. 4A
FIG. 4B
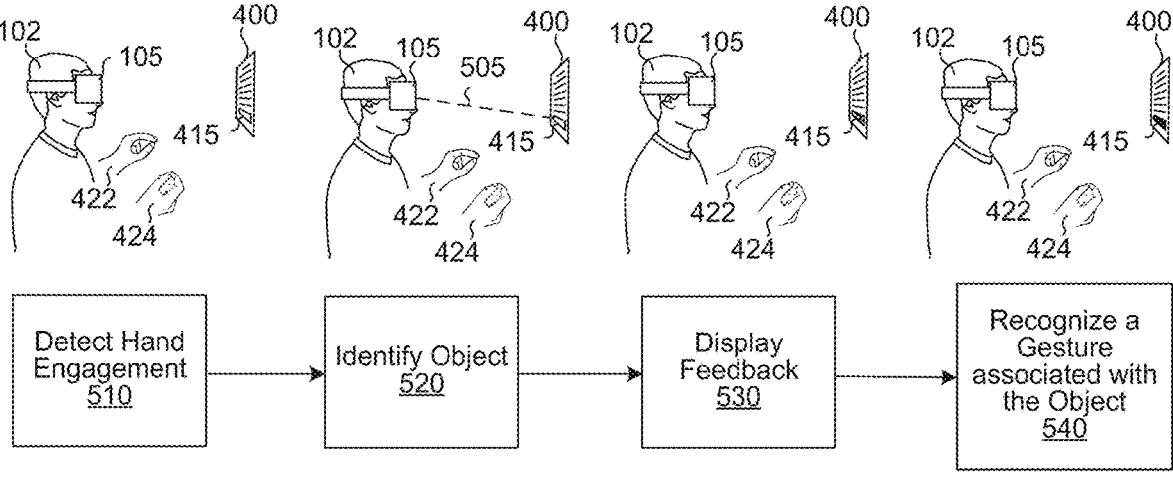
FIG. 5

800

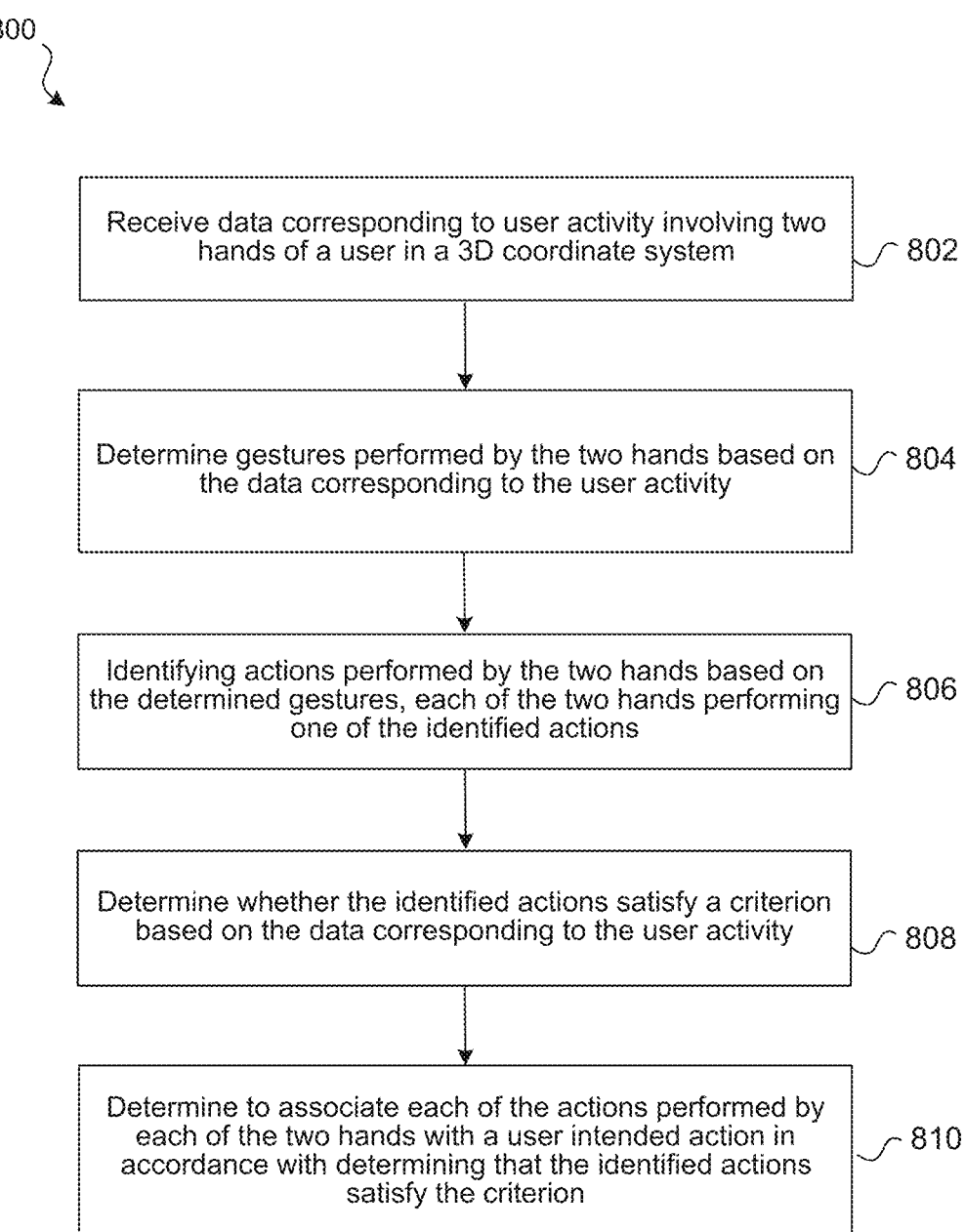

Receive data corresponding to user activity involving two hands of a user in a 3D coordinate system ⌇ 802

Determine gestures performed by the two hands based on the data corresponding to the user activity ⌇ 804

Identifying actions performed by the two hands based on the determined gestures, each of the two hands performing one of the identified actions ⌇ 806

Determine whether the identified actions satisfy a criterion based on the data corresponding to the user activity ⌇ 808

Determine to associate each of the actions performed by each of the two hands with a user intended action in accordance with determining that the identified actions satisfy the criterion ⌇ 810

FIG. 8

Device 900

DETERMINING USER INTENT DURING TWO-HANDED GESTURES

CROSS-REFERENCE TO RELATED APPLICATIONS

This application claims the benefit of U.S. Provisional Application Ser. No. 63/466,450 filed May 15, 2023, and U.S. Provisional Application Ser. No. 63/546,946 filed Nov. 2, 2023, each of which is incorporated by reference herein in its entirety.

TECHNICAL FIELD

The present disclosure generally relates to assessing user interactions with electronic devices that involve two hand gestures and/or other user activity.

BACKGROUND

Hand-based input systems for identifying user input and displaying content based on the hand-based user input may be improved with respect to providing means for users to create, edit, view, or otherwise use content in an extended reality (XR) environment, especially when detecting user intentions for two handed gestures.

SUMMARY

Various implementations disclosed herein include devices, systems, and methods that interpret user activity as user interacts with virtual elements (e.g., user interface elements) positioned within in a three-dimensional (3D) space such as an extended reality (XR) environment. Some implementations utilize an architecture that receives application user interface geometry in a system or shared simulation area and outputs data (e.g., less than all user activity data) for an application to use to recognize input. An operating system (OS) process may be configured to provide an input support process to support recognizing input intended for one or more separately-executing applications, for example, by providing some input recognition tasks to recognize user activity as input for the applications or by converting user activity data into a format that can be more easily, accurately, efficiently, or effectively interpreted by the applications and/or in a way that facilitates preservation of user privacy. The OS process may include a simulation process that utilizes application user interface information to provide 3D information (e.g., 3D world data) used by the input support process to support recognizing input intended for the one or more separate (e.g., separately executing) apps.

Various implementations disclosed herein may interpret intended hand activity for two hands (e.g., hand positions and/or movements) based on motion suppression and determining a user's intent (e.g., pan, zoom, rotate gestures, etc.). For example, unintentional pan may be reduced when it is determined that a user is intending to perform a zoom. This may involve detecting gestures by one or both hands and determining intended hand activity by a pan delta calculation of a user's hand motion and suppression of particular hand motion events based on hand movement. For example, determining if the hands are moving in the same direction compared to away or towards each other, if only one hand is moving, etc. In some implementations, a machine learning algorithm may be used to distinguish a two-handed gesture from simultaneous one-handed gestures.

User privacy may be preserved by only providing some user activity information to the separately-executed apps, e.g., withholding user activity information that is not associated with intentional user actions such as user actions that are intended by the user to provide input or certain types of input. In one example, raw hands and/or gaze data may be excluded from the data provided to the applications such that applications receive limited or no information about where the user is looking or what the user is looking at times when there is no intentional UI interaction.

In general, one innovative aspect of the subject matter described in this specification can be embodied in methods that include the actions of, at a device having a processor and one or more sensors, receiving data corresponding to user activity involving two hands of a user in a 3D coordinate system, determining gestures performed by the two hands based on the data corresponding to the user activity, identifying actions performed by the two hands based on the determined gestures, each of the two hands performing one of the identified actions, determining whether the identified actions satisfy a criterion based on the data corresponding to the user activity, and in accordance with determining that the identified actions satisfy the criterion, determining to associate each of the actions performed by each of the two hands with a user intended action.

These and other embodiments may each optionally include one or more of the following features.

In some aspects, the user activity is determined to provide a single-handed gesture. In some aspects, the user activity is determined to provide a dual-handed gesture. In some aspects, the user intended action includes a pan interaction, a zoom interaction, or a rotation of one or more elements of a user interface.

In some aspects, determining whether the identified actions satisfy the criterion based on the data corresponding to the user activity includes determining a velocity of movement of the two hands, and determining, based on the velocity of movement of the two hands, whether the two hands are moving away or towards each other or if the two hands satisfy a same direction criterion.

In some aspects, in response to determining that the two hands are moving away or towards each other, applying a suppression of a determined component of the movement of the two hands for determining a user intended action.

In some aspects, in response to determining that the two hands satisfy the same direction criterion, applying a limitation of a suppression of a determined component of the movement of the two hands for determining a user intended action.

In some aspects, the limitation of the suppression of the determined component of the movement of the two hands is based on a weighted scale.

In some aspects, determining whether the identified actions satisfy the criterion is based on determining whether the user activity includes motion associated with a pan motion, a zoom motion, a rotation motion, or a combination thereof.

In some aspects, determining the user intended action includes determining that the user activity is associated with two simultaneous two-handed gestures. In some aspects, determining the user intended action includes determining that the user activity is associated with simultaneous one-handed gestures.

In some aspects, the method further includes the actions of using at least a portion of the identified actions performed by the two hands to directly enable a functional component displayed within an extended reality (XR) environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4B illustrates an example of tracking the movements of two hands during an interaction, in accordance with some implementations.

FIG. 5 illustrates an example of interaction recognition of two hands in accordance with some implementations.

FIG. 8 is a flowchart illustrating a method for supporting application input recognition based on activity data associated with two hands, in accordance with some implementations.

Figure 1A:
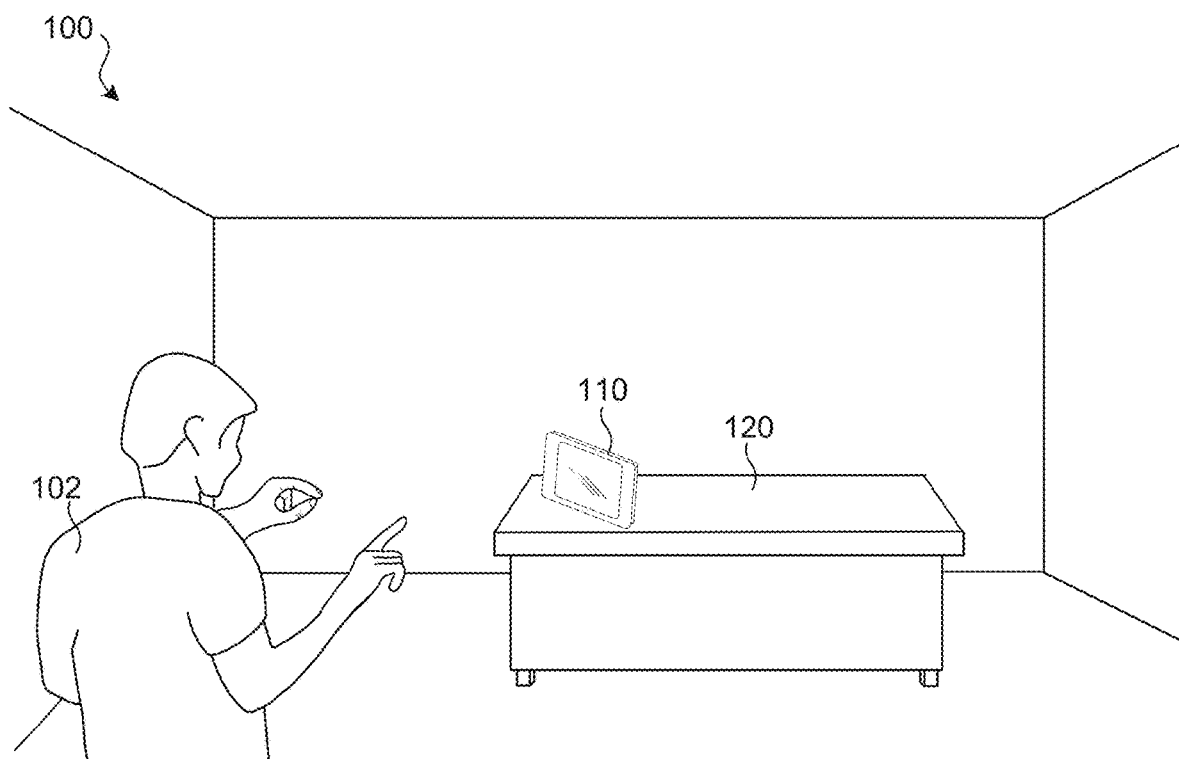
FIGS. 1A-1B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
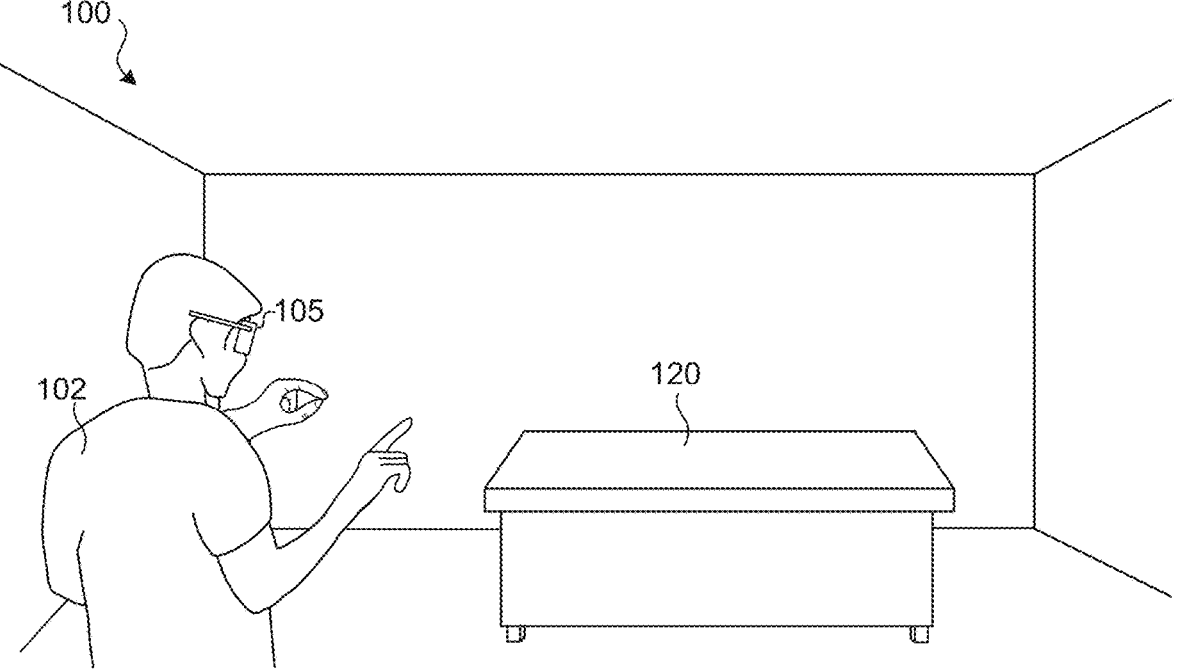

FIGS. 1A-1B illustrate exemplary electronic devices 105 and 110 operating in a physical environment 100. In the example of FIGS. 1A-1B, the physical environment 100 is a room that includes a desk 120. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system (i.e., a 3D space) associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

Figure 2:
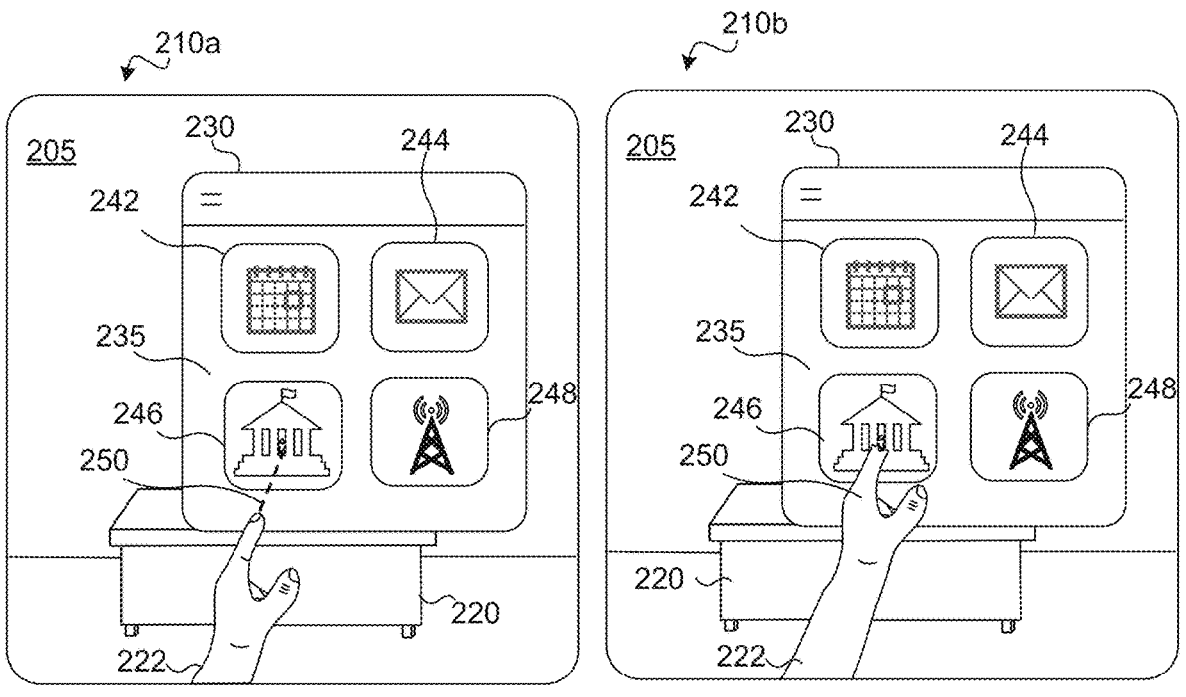
FIG. 2 illustrates views, provided via a device, of virtual elements within the 3D physical environment of FIGS. 1A-1B in which the user performs interactions with one hand in accordance with some implementations.

FIG. 2 illustrates views, provided via a device, of virtual elements within the 3D physical environment 100 of FIGS. 1A-1B, in which the user performs an interaction (e.g., a direct interaction). In the example of FIG. 2, the user 102 makes a single hand gesture (e.g., depiction 222 of the user's 102 left hand) relative to content presented in views 210*a-b* of an XR environment 205 provided by a device (e.g., device 105 or device 110). The views 210*a-b* of the XR environment 205 include an exemplary user interface 230 of an application (i.e., an example of virtual content) and a depiction 220 of the desk 120 (i.e., an example of real content). Providing such a view may involve determining 3D attributes of the physical environment 100 and positioning the virtual content, e.g., user interface 230, in a 3D coordinate system corresponding to that physical environment 100.

In the example of FIG. 2, the user interface 230 includes various content user interface elements, including a background portion 235 and icons 242, 244, 246, 248. The icons 242, 244, 246, 248 may be displayed on the flat user interface 230. The user interface 230 may be a user interface of an application, as illustrated in this example. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the background portion 235 of the user interface 230 is flat. In this example, the background portion 235 includes all aspects of the user interface 230 being displayed except for the icons 242, 244, 246, 248. Displaying a background portion of a user interface of an operating system or application as a flat surface may provide various advantages. Doing so may provide an easy to understand or otherwise use portion of an XR environment for accessing the user interface of the application. In some implementations, multiple user interfaces (e.g., corresponding to multiple, different applications) are presented sequentially and/or simultaneously within an XR environment, e.g., within one or more colliders or other such components.

In some implementations, the positions and/or orientations of such one or more user interfaces may be determined to facilitate visibility and/or use. The one or more user interfaces may be at fixed positions and orientations within the 3D environment. In such cases, user movements would not affect the position or orientation of the user interfaces within the 3D environment.

The position of the user interface within the 3D environment may be based on determining a distance of the user interface from the user (e.g., from an initial or current user position). The position and/or distance from the user may be determined based on various criteria including, but not limited to, criteria that accounts for application type, application functionality, content type, content/text size, environment type, environment size, environment complexity, environment lighting, presence of others in the environment, use of the application or content by multiple users, user preferences, user input, and numerous other factors.

In some implementations, the one or more user interfaces may be body-locked content, e.g., having a distance and orientation offset relative to a portion of the user's body (e.g., their torso). For example, the body-locked content of a user interface could be 0.5 meters away and 45 degrees to the left of the user's torso's forward-facing vector. If the user's head turns while the torso remains static, a body-locked user interface would appear to remain stationary in the 3D environment at 2 m away and 45 degrees to the left of the torso's front facing vector. However, if the user does rotate their torso (e.g., by spinning around in their chair), the body-locked user interface would follow the torso rotation and would be repositioned within the 3D environment such that it is still 0.5 meters away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, a body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement would cause the body-locked content to be repositioned within the 3D environment in order to maintain the distance offset.

In the example of FIG. 2, the user 102 moves their hand from an initial position as illustrated by the position of the depiction 222 in view 210a. The hand moves along path 250 to a later position as illustrated by the position of the depiction 222 in the view 210b. As the user 102 moves their hand along this path 250, the finger intersects the user interface 230. Specifically, as the finger moves along the path 250, it virtually pierces the icon 246 and thus a tip portion of the finger (not shown) is occluded in view 210b by the user interface 230.

Implementations disclosed herein interpret user movements such as the user 102 moving their hand/finger along path 250 relative to a user interface element such as icon 246 to recognize user input/interactions. The interpretation of user movements and other user activity may be based on recognizing user intention using one or more recognition processes.

Recognizing input in the example of FIG. 2 may involve determining that a gesture is a direct interaction and then using a direct input recognition process to recognize the gesture. For example, such a gesture may be interpreted as a tap input to the icon 246. In making such a gesture, the user's actual motion relative to the icon 246 may deviate from an ideal motion (e.g., a straight path through the center of the user interface element in a direction that is perfectly orthogonal to the plane of the user interface element). The actual path may be curved, jagged, or otherwise non-linear and may be at an angle rather than being orthogonal to the plane of the user interface element. The path may have attributes that make it similar to other types of input gestures (e.g., swipes, drags, flicks, etc.) For example, the non-orthogonal motion may make the gesture similar to a swipe motion in which a user provides input by piercing a user interface element and then moving in a direction along the plane of the user interface.

Note that the user's movement in the real world (e.g., physical environment 100) correspond to movements within a 3D space, e.g., an XR environment that is based on the real-world and that includes virtual content such as user interface positioned relative to real-world objects including the user. Thus, the user is moving his hand in the physical environment 100, e.g., through empty space, but that hand (i.e., a depiction or representation of the hand) intersects with and/or pierces through the user interface 230 of the XR environment that is based on that physical environment. In this way, the user virtually interacts directly with the virtual content.

Figure 3:
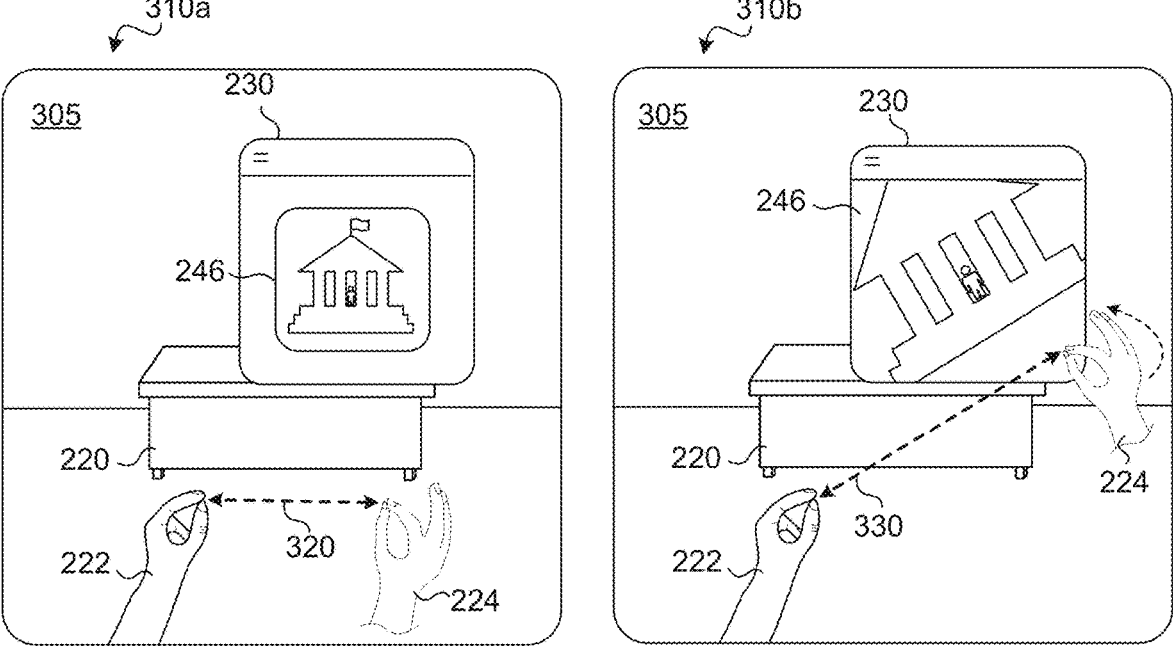
FIG. 3 illustrates views, provided via a device, of virtual elements within the 3D physical environment of FIGS. 1A-1B in which the user performs interactions with two hands in accordance with some implementations.

FIG. 3 illustrates views 310a and 310b, provided via a device, of virtual elements within the 3D physical environment 100 of FIGS. 1A-1B, in which the user performs an interaction (e.g., two handed indirect interactions). In the examples of FIG. 3, the user 102 makes two-handed gestures (e.g., depiction 222 of the user's 102 left hand and depiction 224 of the user's 102 right hand) relative to content presented in views 310a -b of an XR environment 305 provided by a device (e.g., device 105 or device 110). The views 310a-b of the XR environment 305 includes the exemplary user interface 230 of FIG. 2.

In the example of view 310a of FIG. 3, the user 102 makes a pan/zoom gesture with his or her hand as illustrated by the depiction 224 and path 320. In this example, this user activity (e.g., a hand gesture of dragging or stretching a hand) corresponds to a user intention to interact with the user interface icon 246, i.e., a pinch may signify an intention to identify a target of an interaction in order to select and zoom in on the UI component (e.g., to show the interface icon 246 as the only icon within the user interface 230, i.e., to initiate the application as the only application displayed in the UI).

In the example of view 310b of FIG. 3, after selecting the user interface icon 246 in view 310a, the user 102 intends to make a zoom gesture with his or her hand as illustrated by the depiction 224 to expand or zoom in on the content of the user interface icon 246 (e.g., to view the statue within the building image). However, view 310b illustrates how an unintended user activity may result in an unintended action. For example, user 102 may only want to zoom in on the content by performing a zoom action of moving both hands directly away from each other, but because the right hand (e.g., depiction 224) may have included a slight rotation and may not have been a direct perpendicular motion, the content within the user interface icon 246 is not only zoomed in, but is also inadvertently panned up and rotated as direct result of the slight rotation of the right hand.

In this example of FIG. 3, this user activity (e.g., a pinching gesture along with a zoom of content within the UI icon 246) corresponds to a user intention to interact with the content of the user interface icon 246, i.e., the pinch may signify the intention to interact with the target of the interaction. In some implementations, gaze may also be utilized to identify and/or confirm an intended target UI icon to interact with.

FIGS. 2 and 3 illustrate example interactions to interpret user activity within a 3D environment, such as one hand or two-hand gestures, gaze, and the like, to recognize particular types of user interactions. For example, such user activity may be interpreted as a tap input to the icon 246, e.g., selecting icon 246, a particular interaction with the icon 246 (e.g., zoom in), and/or a particular interaction with the content within icon 246 (e.g., zoom/expand upon a content item within the icon). In some implementations, other types or modes of interaction may additionally or alternatively be used including, but not limited to, gaze detection, or user activity via input devices such as keyboards, trackpads, mice, hand-held controllers, and the like. In one example, a user provides an interaction intention via activity (e.g., performing an action such as tapping a button or a trackpad surface) using an input device such as a keyboard, trackpad, mouse, or hand-held controller and a UI target is identified based on the user's gaze direction at the time of the input on the input device. Similarly, user activity may involve voice commands. In one example, a user provides an interaction intention via activity (e.g., performing an action such as tapping a button or a trackpad surface) using an input device such as a keyboard, trackpad, mouse, or hand-held controller and a UI target is identified based on the user's gaze direction at the time of the voice command. In another example, user activity identifies an intention to interact (e.g., via a pinch, hand gesture, voice command, input-device input, etc.) and a UI element is determined based on a non-gaze-based direction, e.g., based on where the user is pinching within the 3D environment. For example, a user may pinch with both hands to provide input indicating an intention to interact with a UI button. In another example, a user may manipulate the orientation of a hand-held device in the 3D environment to control a controller direction (i.e., a virtual line extending from controller within the 3D environment) and a UI element with respect to which the user is interacting may be identified based on the controller direction, i.e., based on identifying what UI element the controller direction intersects with when input indicating an intention to interact is received. Additionally, or alternatively, other gestures may be recognized by the system for performing the same or different interactions. For example, one hand could be pinching while the other may be pointing or doing some other gesture, such as hands balling into a first or opening from a first to an open palm gesture (e.g., perhaps as another away to perform a zoom).

Various implementations disclosed herein provide an input support process, e.g., as an OS process separate from an executing application, that processes user activity data (e.g., regarding gaze, two hand gestures, other 3D activities, HID inputs, etc.) to produce data for an application that the application can interpret as user input. The application may not need to have 3D input recognition capabilities, as the data provided to the application may be in a format that the application can recognize using 2D input recognition capabilities, e.g., those used within applications developed for use on 2D touch-screen and/or 2D cursor-based platforms. Accordingly, at least some aspects of interpreting user activity for an application may be performed by processes outside of the application. Doing so may simplify or reduce the complexity, requirements, etc. of the application's own input recognition processes, ensure uniform, consistent input recognition across multiple, different applications, protect private use data from application access, and numerous other benefits as described herein.

FIG. 4A illustrates an exemplary interaction tracking the movements of two hands 422, 424 of the user 102, as the user 102 is virtually interacting with a UI element of a user interface 400. In this example, the user 102 is using device 105 to view and interact with an XR environment that includes the user interface 400. A direct interaction recognition process may use sensor data and/or UI information to determine, for example, which UI element the user's hand is virtually touching and/or where on that UI element the interaction occurs. Direct interaction may additionally (or alternatively) involve assessing user activity to determine the user's intent, e.g., did the user intend to a straight tap gesture through the UI element or a sliding/scrolling motion along the UI element. Additionally, recognition of user intent may utilize information about the UI elements. For example, determining user intent with respect to UI elements may include the positions, sizing, and type of element, types of interactions that are capable on the element, types of interactions that are enabled on the element, which of a set of potential target elements for a user activity accepts which types of interactions, and the like.

Various two-handed gestures may be enabled based on interpreting hand positions and/or movements using sensor data, e.g., image or other sensor data captured by outward facing sensors on an HMD, such as device 105. For example, a pan gesture may be performed by pinching both hands and then moving both hands in the same direction, e.g., holding the hands out at a fixed distance apart from one another and moving them both an equal amount to the right to provide input to pan to the right. In another example, a zoom gesture may be performed by holding the hands out and moving one or both hands to change the distance between the hands, e.g., moving the hands closer to one another to zoom in and farther from one another to zoom out. Since interpreting such gestures may depend upon the relative movement paths of the hands, the user's actual movements of their hands may not correspond precisely with their intent. For example, when trying to do pan, zoom, rotate gestures, and other two-handed gestures there may be cross talk between gestures. For instance, while doing a zoom, a user's hands may have some two-handed movement that might not be intended as a pan but may be interpreted as such based on an inadvertent synchronized translational movement of the hands determined by a simple application of relative motion gesture interpretation rules. Similarly, while doing a pan, the interpretation system may identify an unintended zoom based on an inadvertent separating movement of the hands. The same issues may apply with two-handed rotate gestures. Implementations disclosed herein provide flexibility in interpreting two-handed gestures to better align the interpretation of the gestures with the user's intent. For instance, when the user is intending to perform a zoom input, inadvertent synchronized translational movements of the hands can be suppressed; and when the user is intending to perform a pan input, inadvertent separating movements of the hands can be suppressed.

FIG. 4B illustrates the different components for identifying and tracking the movements of the two hands (e.g., left hand 422 and right hand 424) of the user 102. For example, pan suppression criterion may be utilized to determine hand velocity and components of pan delta with respect to zoom delta in order to determine whether or not to suppress the component of pan delta orthogonal to the zoom direction. For example, if the system detects the motion away or towards from each other, the system may suppress the component, and if both hands are moving the same direction, the system may limit or avoid suppression all-together. For example, unintentional pan may be reduced when it is determined that a user is intending to perform a zoom.

As illustrated in FIG. 4B, at a first instant in time, left hand 422a and right hand 424a are performing a beginning of a particular motion (e.g., a zoom motion action) and at a second instant in time, the left hand 422b and right hand 424b are at or near an ending of the particular motion (e.g., each hand performing a pinching motion and are separating away from each other). Thus, to determine or calculate the different components of the motion, a centroid 432 (e.g., a 3D coordinate) between each hand 422, 424 of the particular activity (e.g., zoom) is tracked. Based on the tracking of the centroid 432, a pan delta (e.g., line 434) may be determined based on the component of pan delta orthogonal to zoom direction (e.g., line 436) and the component of pan delta along zoom direction (e.g., line 438).

Moreover, as illustrated in FIG. 4B, when the user is performing a zoom, if the hands 422, 424 are moving away or towards each other, the system may suppress the component of pan delta orthogonal to the zoom direction (e.g., line 436). For example, the system may decompose the pan delta (e.g., line 434, centroid 432a to centroid 432b) into a component perpendicular to the direction in which hands are moving away or towards each other (e.g., line 436) and a component along the same direction (e.g., line 438). In some implementations, if the system detects the motion away or towards from each other, it may suppress the component of pan delta along zoom direction (e.g., line 438) if in the same direction. Additionally, if both hands 422, 424 are moving in the same direction, the system may limit or avoid suppression all-together. In some implementations, suppression may be implemented via a weight. In some implementations, suppression may be reduced by a scale factor to reduce magnitude of the component, or using a dead-band, e.g., suppressing it only up to a threshold amount of movement.

In some implementations, it may be possible to calculate the amount of motion on a two-handed gesture centroid (e.g., centroid 432) that is expected to be detected due to hand distance changing from one to the other. The system may not need to check along the whole component along the same direction and instead it may estimate an amount by which to compensate. If one hand is stationary and one is moving, the system may determine that all of that motion should be discarded. However, if the hands are also translating along the same direction and moving with respect to each other, the system may estimate how much of that motion to discard, e.g., how much motion to suppress. Thus, if only one hand is moving, a suppression can be applied. If both hands are moving in the same direction, the system may or may not do some suppression. Suppression may be applied, for example, based on determining that one hand is moving really fast.

In some implementations, motion on a two-handed gesture centroid may be decomposed into motion induced by hand motion relative to each other and bulk hand motion. The system may decompose what motion is due to pan, what motion is due to zoom, etc., without having to aggressively suppress everything that moves along the zoom component and instead just suppress the particular piece due to the zoom.

In some implementations, pan and zoom are enabled to be performed at the same time. For example, with respect to photos, when people are zooming, they may not want to focus on an area at the same time by providing a slight pan. There are various use cases in which users may want to pan, zoom, and/or rotate at the same time. Two hands may be used to pan and zoom one object, e.g., both hands are involved in both gestures. In some implementations, the system performs an algorithm or utilizes a machine learning model that uses motion (of one or both hands) to distinguish circumstances in which a user intends to perform a single two-handed gesture from circumstances in which the user intends to perform two simultaneous two-handed gestures (e.g., pan and zoom at the same time).

In some implementations, the system distinguishes between two-handed gestures and simultaneous one-handed gestures, e.g., in which each hand (left/right) simultaneously performs an independent gesture. For example, one hand may perform a content manipulation task while the other hand performs a one-handed pan (e.g., moving the board behind the object of interaction). In some implementations, the system performs an algorithm or utilizes a machine learning model that uses motion (of one or both hands) to distinguish circumstances in which a user intends to perform a two-handed gesture from simultaneous one-handed gestures.

In some implementations, a detect to zoom is detected and, even if the hands do not move exactly on a zoom axis, the hands motion is interpreted as if it were on the zoom axis. A deviation of more than a threshold from the zoom axis may be detected and used to identify circumstances in which one or more other gestures are additionally (or alternatively intended).

Additionally, or alternatively, in some implementations, recognition of such an interaction of two hands may be based on functions performed both via a system process and via an application process. For example, an OS's input support process may interpret hands data from the device's sensors to identify an interaction event and provide limited or interpreted information about the interaction event to the application that provided the user interface 400. For example, rather than providing detailed hand information (e.g., identifying the 3D positions of multiple joints of a hand model representing the configuration of the hand 422 and hand 424), the OS input support process may simply identify a 2D point within the 2D user interface 400 on the UI element 415 at which the interaction occurred, e.g., an interaction pose. The application process can then interpret this 2D point information (e.g., interpreting it as a selection, mouse-click, touch-screen tap, or other input received at that point) and provide a response, e.g., modifying its UI accordingly.

FIG. 5 illustrates an example of interaction recognition of two hands. In this example, sensor data on device 105 and/or UI information are used to recognize a user interaction made by user 102, e.g., based on outward-facing image sensor data, depth sensor data, eye sensor data, motion sensor data, etc. and/or information made available by an application providing the user interface. Sensor data may be monitored to detect user activity corresponding to an engagement condition corresponding to the start of a user interaction.

In this example, at block 510, the process detects that the user 102 has positioned their hands 422 and 424 within view of outward facing image sensors. It may detect one or more particular one-handed or two-handed configurations, e.g., a claw shape, a pinch, a point, a flat hand, a steady hand in any configuration, etc., as an indication of hand engagement or may simply detect the presence of the hand within sensor view.

At block 520, the process identifies an object. In this example, the process identifies that the gaze direction 505 of user 102 is on user interface element 415. However, the process may identify the object (e.g., user interface element 415) based only on the two-handed gestures (e.g., both hands are identified as trying to interact with user interface element 415).

At block 530, the process displays feedback based on the identified object. In this example, the feedback distinguishes user interface element 415 graphically to indicate that the user interface element 415 now has a different state (e.g., a "hover" state that is analogous to the state of a traditional UI icon when a cursor is on the item without clicking/tapping). In this example, the application that provided the UI information need not be notified of the hover state and associated feedback. Instead, the hand engagement, object identification, and display of feedback can be handled out of a process (i.e., outside of the application process), e.g., by the operating system processes. For example, such processes may be provided via an operating system's input support process. Doing so may reduce or minimize potentially sensitive user information (e.g., such as constant gaze direction vectors or hand motion direction vectors) that might otherwise be provided to application to enable the application to handle these functions within the application process. Whether and how to display feedback may be specified by the application even though it is carried out of a process. For example, the application may define that an element should display hover or highlight feedback and define how the hover or highlight will appear such that the out of process aspect (e.g., operating system) may provide the hover or highlight according to the defined appearance. Alternatively, feedback can be defined out-of-process (e.g., solely by the OS) or defined to use a default appearance/animation if the application does not specify an appearance.

At block 540, the process recognizes a gesture to be associated with the identified object. In this example, the user is gazing at user interface element 415 while (or at least near in time) to a pinching gesture by hand 422 and a pinching gesture by hand 424. The pinch gestures, in this example, are interpreted to initiate an action upon the user interface element 415, e.g., causing a selection action that is analogous to a "click" event of a traditional UI icon during which a cursor is positioned on an icon and a trigger such as a mouse click or track pad tap is received or similarly analogous to a touch screen "tap" event. And if the user than performs an action of moving hand 422 and hand 424 away from each other, then the action may include a "zoom" event, as discussed herein. Additionally, or alternatively, other gestures may be recognized by the system for performing the same or different interactions with the user interface element 415. For example, one hand could be pinching while the other may be pointing or doing some other gesture, such as hands balling into a first or opening from a first to an open palm gesture (e.g., perhaps as another away to perform a zoom).

Recognition of such an interaction may be based on functions performed both via a system process and via an application process. For example, an OS's input process may interpret hands and optionally gaze data from the device's sensors to identify an interaction event and provide limited or interpreted/abstracted information about the interaction event to the application that provided the user interface 400. For example, rather than providing gaze direction information identifying gaze direction 505, the OS input support process may identify a 2D point within the 2D user interface 400 on the UI element 415, e.g., an interaction pose. The application process can then interpret this 2D point information (e.g., interpreting it as a selection, mouse-click, touch-screen tap, or other input received at that point) and provide a response, e.g., modifying its UI accordingly.

FIG. 5 illustrates examples of recognizing indirect user interactions. Numerous other types of indirect interactions can be recognized, e.g., based on one or more user actions identifying a user interface element and/or one or more user actions providing input (e.g., no-action/hover type input, selection type input, input having a direction, path, speed, acceleration, etc.). Input in 3D space that is analogous to input on 2D interfaces may be recognized, e.g., input analogous to mouse movements, mouse button clicks, touch screen touch events, trackpad events, joystick events, game controller events, etc.

Some implementations utilize an out of process (i.e., outside of an application process) input support framework to facilitate accurate, consistent, and efficient input recognition in a way that preserves private user information. For example, aspects of the input recognition process may be performed out of process such that applications have little or no access to information about where a user is looking, e.g., gaze directions. In some implementations, application access to some user activity information (e.g., gaze direction-based data) is limited to only a particular type of user activity, e.g., activity satisfying particular criteria. For example, applications may be limited to receive only information associated with deliberate or intentional user activity, e.g., deliberate or intentional actions indicative of an intention to interact with (e.g., select, activate, move, etc.) a user interface element.

Some implementations recognize input using functional elements performed both via an application process and a system process that is outside of the application process. Thus, in contrast to a framework in which all (or most) input recognition functions are managed within an application process, some algorithms involved in the input recognition may be moved out of process, i.e., outside of the application process. For example, this may involve moving algorithms that detect gaze input and intent out of an application's process such that the application does not have access to user activity data corresponding to where a user is looking or only has access to such information in certain circumstances, e.g., only for specific instances during which the user exhibits an intent to interact with a user interface element.

Some implementations recognize input using a model in which an application declares or otherwise provides information about its UI elements so that a system process that is outside of the application process can better facilitate input recognition. For example, an application may declare the locations and/or UI behaviors/capabilities of its buttons, scroll bars, menus, objects, and other UI elements. Such declarations may identify how a user interface should behave given different types of user activity, e.g., this button should (or should not) exhibit hover feedback when the user looks at it.

The system process (e.g., outside of the application process) may use such information to provide the desired UI behavior (e.g., providing hover feedback in appropriate user activity circumstances). For example, the system process may trigger hover feedback for a UI element based on a declaration from the application that the app's UI includes the element and that it should display hover feedback, e.g., when gazed upon. The system process may provide such hover feedback based on recognizing the triggering user activity (e.g., gaze at the UI object) and may do so without revealing to the application the user activity details associated with the user activity that triggered the hover, the occurrence of the user activity that triggered the hover feedback, and/or that the hover feedback was provided. The application may be unaware of the user's gaze direction and/or that hover feedback was provided for the UI element.

In another example, an application declares a menu as part of its user interface and declares that the menu is expandable using a set of identified expanded menu options. The system process may handle the expansion of the UI menu. The system process may provide menu expansion (e.g., via a system process outside of the application process) based on recognizing a triggering user activity (e.g., gaze at the menu's label) and may do so without revealing to the application the user activity details associated with the user activity that triggered the menu expansion, the occurrence of the user activity that triggered the menu expansion, and/or that the fact that the menu was expanded. The application may be unaware of the user's gaze direction and/or that the menu was expanded.

Some aspects of input recognition may be handled by the application itself, i.e., in process. However, the system process may filter, abstract, or otherwise manage the information that is made available to the application to recognize input to the application. The system process may do so in ways that facilitate input recognition that is efficient, accurate, consistent (within the application and across multiple applications), and that allow the application to potentially use easier-to-implement input recognition and/or legacy input recognition processes, such as input recognition processes developed for different systems or input environment, e.g., using touch screen input processes used in legacy mobile apps.

Some implementations, use a system process to provide interaction event data to applications to enable the applications to recognize input. The interaction event data may be limited so that all user activity data is not available to the applications. Providing only limited user activity information may help protect user privacy. The interaction event data may be configured to correspond to events that can be recognized by the application using a general or legacy recognition process. For example, a system process may interpret 3D user activity data to provide interaction event data to an application that the application can recognize in the same way that the application would recognize a touch event on a touch screen. In some implementations, an application receives interaction event data corresponding to only certain types of user activity, e.g., intentional or deliberate actions on user interface objects, and may not receive information about other types of user activity, e.g., gaze only activities, a user moving their hands in ways not associated with UI-interactions, a user moving closer to or further away from the user interface, etc. In one example, during a period of time (e.g., a minute, 10 minutes, etc.) a user gazes around a 3D XR environment including gazes at certain user interface text, buttons, and other user interface elements and eventually performs an intentional UI interaction, e.g., by making an intentional pinch gesture while gazing at button X. A system process may handle all of the user interface feedback during the gazing around at the various UI elements without providing the application information about these gazes. On the other hand, the system process may provide interaction event data to the application based on the intentional pinch gesture while gazing at button X. However, even this interaction event data may provide limited information to the application, e.g., providing an interaction position or pose identifying an interaction point on button X without providing information about the actual gaze direction. The application can then interpret this interaction point as an interaction with the button X and respond accordingly. Thus, user behavior that is not associated with intentional user interactions with UI elements (e.g., gaze only hover, menu expansion, reading, etc.) are handled out of process without the application having access to user data and the information about the intentional user interface element interactions is limited such that it does not include all of the user activity details.

Figure 6:
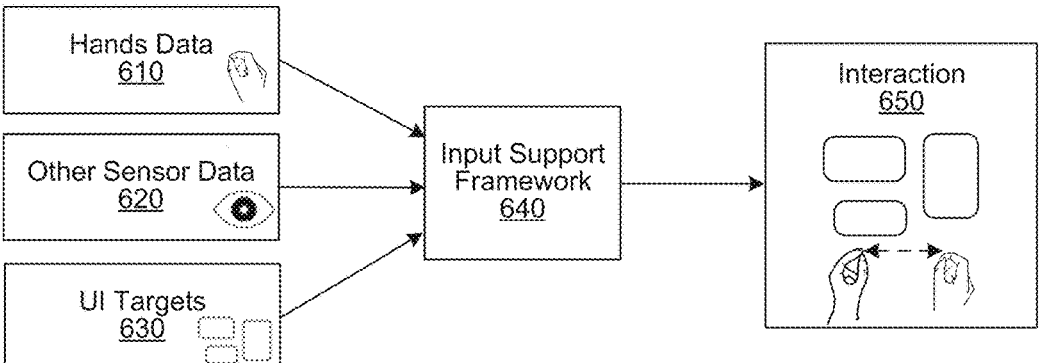
FIG. 6 illustrates use of an exemplary input support framework to generate interaction data based on hands data, other sensor data, and UI target data, in accordance with some implementations.

FIG. 6 illustrates use of an exemplary input support framework 640 to generate interaction data based on hands data 610, other sensor data 620 (e.g., gaze data), and UI target data 630 to produce interaction data 650 that can be provided to one or more applications and/or used by system processes to provide a desirable user experience. In some implementations, the input support framework 640 is configured to understand a user's intent to interact, generate input signals and events to create reliable and consistent user experiences across multiple applications, detect input out-of-process and route it through the system responsibly. The input support framework 640 may arbitrate which application, process, and/or UI element should receive user input, for example, based identifying which application or UI element is the intended target of a user activity. The input support framework 640 may keep sensitive user data, e.g., gaze, hand/body enrollment data, etc., private; only sharing abstracted or high-level information with applications.

The input support framework 640 may take hands data 610, other sensor data 620 (e.g., gaze data), and UI target data 630 and determine user interaction states. In some implementations, it does so within a user environment in which multiple input modalities are available to the user, e.g., an environment in which a user can interact directly as illustrated in FIG. 2 or indirectly as illustrated in FIG. 3 to achieve the same interactions with UI elements. For example, the input support process may determine that the user's right hand is performing an intentional pinch and gaze interaction with a user interface element, that the left hand is directly tapping a user interface element, or that the left hand is fidgeting and therefor idle/doing nothing relevant to the user interface.

Based on determining a user intent to interact, the input support framework 640 may generate interaction data 650 (e.g., including an interaction pose, manipulator pose, and/or interaction state). The input support framework may generate input signals and events that applications may consume without needed custom or 3D input recognition algorithms in process. In some implementations, the input support framework provides interaction data 650 in a format that an application can consume as a touch event on a touch screen or as track pad tap with a 2D cursor at a particular position. Doing so may enable the same application (with little or no additional input recognition processes) to interpret interactions across different environments including a new environment for which an application was not originally created and/or using new and different input modalities. Moreover, application responses to input may be more reliable and consistent across applications in a given environment and across different environments, e.g., enabling consistent UI responses for 2D interactions with the application on tablets, mobile devices, laptops, etc. as well as for 3D interactions with the application on an HMD and/or other 3D/XR devices.

The input support framework may also manage user activity data such that different apps are not aware of user activity relevant to other apps, e.g., one application will not receive user activity information while a user types a password into another app. Doing so may involve the input support framework accurately recognizing to which application a user's activity corresponds and then routing the interaction data 650 to only the right application. An application may leverage multiple processes for hosting different UI elements (e.g., using an out-of-process photo picker) for various reasons (e.g., privacy). The input support framework may accurately recognize to which process a user's activity corresponds and route the interaction data 650 to only the right process. The input support framework may use details about the UIs of multiple, potential target apps and/or processes to disambiguate input.

Figure 7:
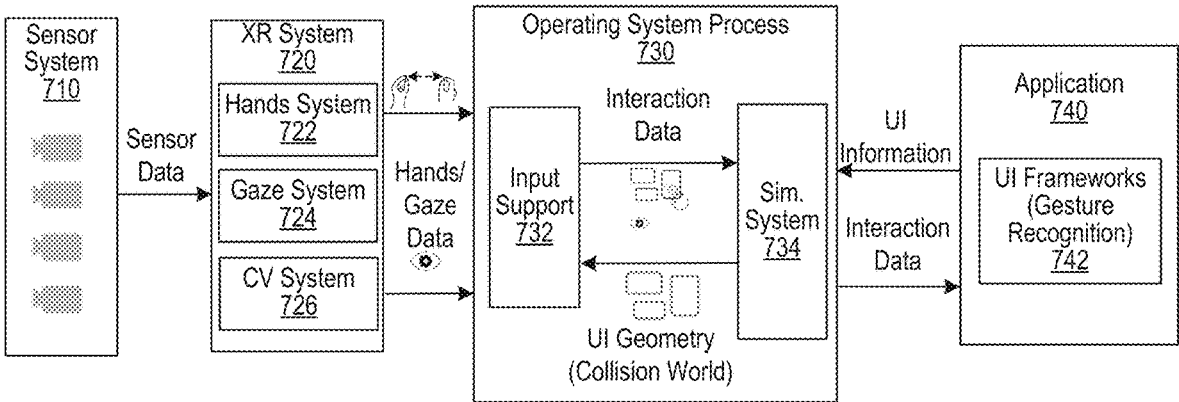
FIG. 7 illustrates an exemplary architecture that receives user activity data and application user interface information at a system process that outputs interaction event data for one or more applications to use to recognize input, in accordance with some implementations.

FIG. 7 illustrates an exemplary architecture that receives user activity data and application UI information at a system process that outputs interaction events data for one or more applications to use to recognize input.

In this example, the sensor system 710 and XR system 720 can be considered a sensing layer, e.g., determining where the user's hands are in the 3D world, where the user is gazing in the 3D world, etc., and the OS process 730 and application 740 can be considered an interaction layer, e.g., determining what the user is interacting with, how the user is interacting, etc.

The sensor system 710 may include various sensors, including, but not limited to, color/RGB image sensors, greyscale image sensors, depth sensors, dynamic vision sensors, motion sensors, etc. The sensor systems may include Image Signal Processor (ISP) components and/or other components that process sensor data.

The sensor system 710 may provide the sensor data to the XR system 720 in various forms. In some implementations, sensor data is sent over time, periodically, and/or at a fixed rate, e.g., at X frames of sensor data per second (fps). In one example, hands data based on images captured by one or more outward facing image sensors (e.g., on a device such as an HMD) is sent to the XR system 720 at a fixed rate (e.g., 10 fps, 20 fps, 30 fps, 60 fps, 120 fps, etc.). In another example, such hands data is sent at a non-fixed rate or otherwise irregularly. In one example, gaze data based on images captured by one or more inward facing image sensors (e.g., on the inside of a device such as an HMD) is sent to the XR system 720 at a fixed rate (e.g., 10 fps, 20 fps, 30 fps, 60 fps, 120 fps, etc.). In another example, such gaze data is sent at a non-fixed rate or otherwise irregularly. Hands data and gaze data may be sent to the XR system 720 at the same or different rates and/or the same or different times. The sensor data may include additional types of information and/or may provide information about other parts of the user or the physical environment in which the user is within. Such other sensor data may be provided at the same or different rates and/or at the same or different times as the hands data and/or gaze data.

The XR system 720 utilizes the received sensor data to perform user activity monitoring and/or tracking. In one example, the XR system 720 is configured to provide relatively low-level tracking algorithms. For example, the hands system 722 of the XR system 720 may use the sensor data to perform a hand tracking algorithm to track the positions, pose (e.g., position and orientation), configuration (e.g., shape), or other aspects of each hand over time. The hands system 722 may generate, update, and/or track a 3D model of each hand, e.g., a model of the hand that represents the hand's shape using defined "joints" or nodes that may or may not correspond to the user's physiological hand joints. In one example, a hand model of 20+joints are maintained for each hand over time based on the sensor data such that the hands data generated by hands system 722 represents the current position/pose/configuration of the hand at different points in time, which may enable determining 3D movements or other changes made by a hand over time. The hands system may alternatively (or additionally) track a subset of points on a surface of each hand, e.g., tracking the positions of one or more fingertips/thumb-tips of one or both of the user's hands. Such tracking may, but need not, include determining when such portions (e.g., fingertips/thumb-tips) are touching one another and/or other portions of the user or the physical environment. The hands system 722 may output hand position, pose, and/or configuration information as well as confidence values corresponding to such hand data.

The gaze system 724 of the XR system 720 may use the sensor data to perform a gaze tracking algorithm to track eye characteristics such as, but not limited to gaze direction, over time. The gaze system 724 may use the sensor data to directly (e.g., without modeling the shape of the eye and/or head) determine a gaze direction of one or both eyes. The gaze system 724 may use the sensor data to generate, update, and/or track a 3D model of an eye, e.g., a model of the eye that represents the eye's shape based on identifying the positions of points (e.g., eyeball center, cornea center, pupil center, etc.), dimensions (e.g., eye-ball diameter, pupil diameter, etc.), and/or surface portions of the eye. In one example, the gaze system 724 outputs a stream of gaze directions (e.g., vector in 3D space or relative to the user's current position) of each eye over time. In one example, the gaze system 724 outputs gaze directions and confidence values corresponding to such gaze directions.

The XR system 720 may include a computer vision (CV) system 726 that underpins or otherwise supports the hands system 722, gaze system 724, and/or other XR system sub-systems (not shown). For example, the CV system 726 may perform one or more environment and/or user assessment algorithms, e.g., performing simultaneous localization and mapping (SLAM) to model the 3D physical environment and keep track of the user's position relative to that model. In another example, the CV system 726 may identify objects such as walls, doors, tables, appliances, etc., within the physical environment and/or the positions of such objects. In another example, the CV system 726 may perform a semantic understanding algorithm to semantically label objects within the physical environment. In another example, the CV system 726 may use sensor data associated to assess user characteristics (e.g., type of activity currently being performed (e.g., exercise, work, meditation, etc.), posture/motion (e.g., sitting, standing, walking, running, driving, etc.), and/or other user characteristics). Such user characteristic data may be used by hands system 722 and/or gaze system 724 to improve their efficiency and/or accuracy.

In FIG. 7, the XR system 720 provides hands/gaze data to the operating system process 730. The hands/gaze data may be provided periodically (e.g., at a fixed frame rate corresponding to the sensor capture rate or otherwise) or irregularly. In one example, the hands data is provided at the same frame rate per second as the gaze data. In another example, the hands data is provided at a different frame rate than the gaze data.

The hands/gaze data received by the operating system process 730 may be used by the input support process 732 to (1) itself provide/initiate some responses on to user activity on behalf of the application 740 and/or (2) provide some information (e.g., interaction data) to the application 740 to enable the application 740 to respond to user activity. The input support process 732/operating system process 730 may provide an application with information about a first type of user activity (e.g., activity determined to correspond to intentional user interactions with UI elements). Thus, as illustrated in FIG. 7, the input support process 732 generates interaction data that is provided to the application 740. This interaction data provided to the application 740 may exclude or convert/abstract the hands/gaze data (and other user-based information). The application 740 may receive only interaction data and thus may not receive data about other types of user activities, e.g., user activity deemed to be something other than an intentional interaction with a UI element such as user activity in which the user is simply gazing over the UI or other portions of an XR environment or during which the user is reading text displayed within the application's UI. Note that, in this example of FIG. 7, the interaction data provided by the input support process 732 is provided to the application 740 via a simulation system 734. However, in other examples, the input support process 732 may provide such interaction data to the application 740 directly or via a different intermediary.

In some implementations, the input support system 732 uses information about the user interface of one or more applications such as application 740 to provide input support to those applications. In some implementations, the application 740 sends user interface information to input support system 732 that the input support system 732 utilizes to interpret user interactions associated with the application

740. For example, the application 740 may provide information that defines the appearance of a rectangular region containing a set of user interface elements at specified positions and having certain desired interaction capabilities (e.g., selectable, non-selectable, hoverable, non-hoverable, expandable, non-expandable, etc.). The application 740 may define the type, position, visual appearance, functional characteristics, or other aspects of such elements for use by the input support system 732. The application 740 may provide information to the input support system 732 about its UI elements that defines what information the application 740 will receive. For example, based on defining a button component, the application 740 may receive input events associated with the button when the input support system recognizes user activity (e.g., a pinch and gaze, etc.) as an intentional interaction with the button element.

In some implementations, it may be undesirable for an input support process (e.g., a hit testing process) to receive and/or use an entire UI, e.g., it may be computationally or resource intensive and/or complex to do so. In some implementations, less than all UI information is provided to an input support process. In some implementations, high level information (e.g., window/collider geometry) may be shared with the input support process and the input support process may query/request more information on demand. For example, an input support process may identify user activity/input and perform a hit test based on high level UI information that has been provided by one or more applications or otherwise. In one example, a hit test on a collider identifies an external effect, and the input support process may then ask for more information, e.g., its specific geometry, or more information about any attached gesture recognizers from the OS's simulation system and/or the application that provided the UI having that element. In this exemplary approach, the application still communicates some or all information to the system (e.g., a simulation system provided by the OS), for example, by defining external effects, e.g., communicating everything holistically to the system. However, the input support process need not receive or use the comprehensive information and instead may query for more details about the UI as it discovers (e.g., via hit testing, fuzzy hit testing, etc.) that more information is needed.

In some implementations, the input support system 732 may use information about the positioning of an application user interface and/or the user interface elements within such user interfaces to better understand the user's activity and/or intentions and ultimately to provide a more accurate, more enjoyable, or otherwise better experience for the user. For example, the input support system 732 may use information about the positioning of application user interface and/or the user interface elements within such user interfaces to (a) distinguish user activity associated with a first type of user activity (e.g., intentional interaction events) from other types of user activity, (b) determine to which user activities to respond to directly and to which user activities the application will respond, and thus selectively provide the application 740 with information limited to the user activities to which the application 740 will itself respond, (c) respond to some user activity associated with the application 740 (e.g., providing hover feedback without needing to notify the application 740), and/or (d) target user activity towards one of multiple applications to which user activity could potentially be intended.

In the example of FIG. 7, the simulation system process 734 provides the input support process 732 with UI geometry (e.g., collision world) data to enable the input support process 732 to better support input to applications and/or other XR environment elements. The simulation system process 734 may generate, update, and/or maintain information about items within a 3D XR environment, e.g., maintaining a current understanding/snapshot view of everything within the environment. This may involve determining where virtual content will be positioned within a XR environment that is based on a user's physical environment. For example, the simulation system process 734 may determine that a first application's UI is to be positioned above the surface of a user's physical desk in an XR environment and a second applications' UI is to be positioned in front of the window to the side of the user's desk.

The simulation system process 734 may determine where to position and how to configure (e.g., by determining container sizes and dimensions) spaces for application UI content to be rendered within a 3D XR environment based on information provided by the applications. In the example of FIG. 7, the application 740 provides UI information (e.g., that may include UI element declarations) that the simulation system process 734 uses to determine where to position and how to configure the spaces for the application's user interface. In one example, configuring the application's UI involves determining a position for one or more containers/colliders (e.g., one or more flat rectangular or other 2D shaped windows or one or more square or other 3D shaped bounding areas) in which the applications' UI will be positioned in 3D space. The simulation system process 734 may position containers for each of one or more applications based on the UI information (e.g., UI declarations) provided by those applications. It may account for surroundings (e.g., the size of the room or other characteristics the XR environment), the user's position, activity, and preferences, and numerous other considerations in determining where and how to organize and manage the 3D positioning of objects within an XR environment. Applications need not know (or be informed about) the positions of their user interfaces within a 3D XR environment.

The simulation system process 734 may determine not only the positions of user interface container/collider features such as windows containing all application content but also other user interface elements with respect to which user interactions and user activity may relate. Such user interface elements include, but are not limited to, text elements, buttons, sliders, scroll bars, pickers (e.g., color pickers), menu controls, timelines, images, vector graphics, rulers, icons, and tabs.

Tracking user interface element positions within the 3D XR environment and providing such information to input support process 732 may enable input support process 732 to more efficiently, accurately, and effectively support input processes including, but not limited to, supporting input to applications such as application 740. Moreover, using such information may additionally enable input support process 732 to do so in a way that protects the privacy of the user by limiting the information about user activity that is exposed to application 740.

For example, the input support process 732 may use hands data from hands system 722 to determine that a user is not currently making a gesture indicative of interaction intent (e.g., hand is not pinching, zoom and/or pan motion, etc.) and use a gaze direction from the gaze system 724 to determine that the user is gazing at a particular button within the user interface of application 740 within the 3D environment maintained by the simulation system process 734. The input support process 732 can use this to initiate an out of process (e.g., outside of the application process) response, e.g., the simulation system process 734 may provide hover feedback highlighting the button to the user. The application 740 need not receive any information about the user's current user activity (e.g., the user's hand state and/or gaze state) and need not even be aware that the hover feedback was provided by the system. In this example, the input support process 732 uses the UI geometry information provided by the simulation system 734 and based on UI information provided by the application 740 to provide a response on to user activity on behalf of the application 740 without the application needed to itself be involved. Avoiding providing user activity data about some types of user activity (e.g., unintentional activity) can help protect user private data from application 740.

In another example, the input support process 732 may use hands data from hands system 722 to determine that a user is not currently making a gesture indicative of interaction intent (e.g., hand is not pinching, zoom and/or pan motion, etc.) and use a gaze direction from the gaze system 724 to determine that the user is gazing at a menu heading within the user interface of application 740 within the 3D environment maintained by the simulation system process 734. The input support process 732 can use this to initiate an out of process (e.g., outside of the application process) response, e.g., the simulation system process 734 may provide an expansion of the menu showing previously hidden menu options to the user. The application 740 need not receive any information about the user's current user activity (e.g., the user's hand state and/or gaze state) and need not even be aware that the menu was expanded. In this example, the input support process 732 uses the UI geometry information (e.g., identifying the menu and its menu options and their positions within 3D space) provided by the simulation system 734 and based on UI information provided by the application 740 to provide a response on to user activity on behalf of the application 740 without the application needed to itself be involved. Avoiding providing user activity data about some types of user activity (e.g., unintentional activity) can help protect user private data from application 740.

The input support process 732 may additionally (or alternatively) use the UI geometry information (provided by the simulation system 734 and based on UI information provided by the application 740) to provide information to the application 740 to respond itself to user activity. In some implementations, such information is limited to only user activity associated with a first type of user activity, e.g., user activity associated with an intentional interaction with a user interface element. The input support process 732 may provide information (e.g., interaction data) to enable the application 740 to respond to user activity itself. Such information may process or limit the user activity data (e.g., the hands/gaze data received from the XR system 720) such that the application 740 does not obtain detailed user data, e.g., data about specific user gaze directions, user hand size/shape, etc.

For example, the input support process 732 may use hands data from hands system 722 to determine that a user is currently making a gesture indicative of interaction intent (e.g., hand is pinching, zoom and/or pan motion, etc.) and use a gaze direction from the gaze system 724 to determine that the user is gazing at a particular button within the user interface of application 740 within the 3D environment maintained by the simulation system process 734. Based on determining that this user activity (e.g., pinch and gaze) satisfies criteria to qualify as a first type of user activity (e.g., an intentional interaction with a UI element), the input support process 732 can generate data (e.g., interaction data) that is different than the raw hands and raw gaze data to send to the application 740 to enable the application 740 to respond to the user activity itself. The application 740 need not receive the raw hands data and/or the raw gaze data associated with the user's current activity and need not even be aware that the user activity was gaze/hands-based. Rather, the data provided to the application 740 may simply be sufficient for the application 740 to recognize an input event (e.g., a hit event) to the button of the user interface of the application 740. Such data may have been abstracted to use input modality agnostic format or a single input modality format that may differ from the input modalities available on the device (e.g., using a touch-screen input modality format). Avoiding providing detailed user activity (e.g., detailed hands or gaze data) can help protect user private data from application 740.

The data provided to application 740 that enables the application 740 to respond to input to its UI elements can have various forms. In some implementations, such data is limited to only certain types of user activity and thus the data format reflects this, e.g., the application 740 may be provided with data defining an interaction event in circumstances in which the application is to be provided data to respond to intentional UI interaction events. In one example, an application 740 is only provided information identifying a UI element that was interacted with and the type of event, e.g., button X received a hit type interaction.

In other implementations, an application 740 has an input recognition framework for a particular input environment (e.g., a 2D input environment) and the data provided to the application 740 mimics the format of that input environment. For example, an application 740 may be configured with a 2D input recognition framework in which the application 740 is configured to recognize 2D touch input on a touch screen device, e.g., receiving interaction pose data identifying touch points and directions for user touches to a touch screen interface. Note that the term "pose" here refers to such information identifying a 2D position on a touch screen and/or a direction associated with the touch—it may involve receiving only 2D position or it may involve receiving 2D position and directional data. In this example, such an application 740 with a 2D input recognition framework may be provided with data that mimics a touch event. For example, the input support process 732 may use hands data from hands system 722 to determine that a user is currently making a gesture indicative of interaction intent (e.g., hand is pinching, zoom and/or pan motion, etc.) and use a gaze direction from the gaze system 724 to determine that the user is gazing at a particular button within the user interface of application 740 within the 3D environment maintained by the simulation system process 734. The input support process 732 may generate interaction data that identifies the 2D position of the gaze direction relative to the application's user interface element and provides this as an interaction pose to the application 740 so that the application 740 can interpret this as a touch event (e.g., a tap) at that position (on the button) and initiate an appropriate response. The application 740 need only receive the interaction pose without needing to receive the raw hands or gaze data. In this example, the application 740 knows the point of interaction (in its 2D space) but does not know (and does not need to know for input recognition purposes) the gaze direction in the 3D space of the XR environment.

In some implementations, events can contain optional "extra data," e.g., a 2D touch point may identify a 2D position and extra 3D depth information. Such extra information can be leveraged in various ways. For example, if a developer rebuilds an app, they can configure the app to use this extra data. As another example, even if the developer does not rebuild the app, the underlying UI Framework maintained by the operating system provider/application execution environment can leverage this extra data inside its gesture recognizers, since the app will often call higher level APIs, which themselves are built natively for the operating system and linked at runtime.

In some implementations, the use of input support process 732 enables execution of application 740 in an environment different than its original or intended environment. For example, the application 740 may be originally compiled or intended for execution on a mobile device having a 2D touch screen input environment or a laptop having a 2D mouse/trackpad driven environment. The application 740 may be executed within a device that offers 3D input modalities and receive data from the input support process 732 (corresponding to those 3D input modalities that the application 740 cannot directly recognize) in a format that the application 740 can recognize, e.g., as a 2D input corresponding to touch screen or mouse/trackpad-driven input. An application intended for a mobile device, laptop, or other device may be executed within an HMD environment that enables 3D interactions without needing to make significant (or any) modifications to the input recognition processes of the application. In one example, an HMD is configured with binary compatibility to mobile and/or laptop devices, e.g., made capable of executing the binary or object code executable of mobile and/or laptop devices) and provides enhanced input capabilities to mobile and/or laptop applications executing on the HMD by utilizing an input support process 732 that provides data based on user activity in a 3D environment that the applications can recognize as 2D modality-based input.

In the above example, the application 740 may be provided with additional information. For example, the application 740 may receive information about the location of the pinching hand, e.g., a manipulator pose. Such hand information may be a higher level than the raw hands data. For example, the application 740 may receive a manipulator pose that identifies the position and/or orientation of the hand within 3D space without receiving information about the hand's configuration and/or information about a 3D model (e.g., of joints) used to represent the hand's positions, pose, and/or configuration in 3D space. In another example, the application 740 may receive information about an interaction state, e.g., identifying a type of interaction as determined by the input support process 732.

In the above example, the criteria for identifying a first type of user activity (e.g., activity associated with intentional user element interaction) involves assessing whether the user's hand exhibited a particular configuration (e.g., a pinch gesture) and, based on identifying the hand exhibiting such a configuration, identifying other concurrent user activity, e.g., identifying where the user is gazing at (or near) that time. Such a pinch may be determined based on criteria that assesses the proximity of portions of a user hand model to one another (e.g., how close is the fingertip to the thumb tip, etc.), using a classifier or other algorithm to label or classify a user hand configuration, or otherwise by processing the hands data. Other types of user activity and/or criteria may be used to identify a first type of user activity (e.g., activity associated with intentional user element interaction). For example, a voice command may be recognized as an indicator of intentional activity, e.g., recognizing a key word or phrase such as "select" or "hit" or "tap" or "click this" and then associating a gaze direction and/or other user activity occurring during or near the time of the utterance of the key word or phrase with the intention to interact, e.g., using the other activity to identify the UI element target upon which the action will be taken.

The input support process 732 may additionally account for sensor-based or other inaccuracies in the hands and/or gaze data. Tracking user application interface element positions within the 3D XR environment and providing such information to input support process 732 may enable it to account for such inaccuracies. Moreover, it may be desirable to a use a system (shared) process so that such inaccuracies can be accounted for consistently and effectively across multiple applications. In other words, it may be desirable to have a single shared process performing such corrections rather than having individual applications doing so. In one example, a user gazes at a button but the gaze system 724 generates a user's gaze direction that is slightly outside of the button (e.g., 0.5 degrees outside). The input support process 732 may correct this error. For example, it may determine that the gaze was likely actually directed at the button since it is within a threshold (e.g., 1 degree) of the button and there is nothing else nearby. The input support process 732 may correct this in providing the data to the application 740 that enables the application to respond to the user activity. For example, rather than providing an inter-action pose slightly outside of the button, it may provide an interaction pose that is within the button, e.g., at the button's edge. The application 740 thus need not account for the gaze inaccuracy in its own input recognition processes, e.g., it need not itself determine whether an interaction pose just outside of the button should be considered a within the button. This may be particularly useful if the application 740 uses a framework from another input paradigm, e.g., a touch screen paradigm that utilizes different (potentially much smaller) inaccuracy/error thresholds. Such an application would not have to implement different thresholds for different inaccuracy levels expected in different input modalities. Having the input support process (e.g., an OS process) correct for such inaccuracies may provide more consistent and accurate results without requiring that application developers devote extensive resources to addressing such inaccuracies and/or differences amongst different input modalities.

The application 740 may provide UI information to the operating system process 730 in various formats. In some implementations, the application 740 declares its UI elements, e.g., declaring a hierarchy of UI elements within its user interface. Such declarations may include information/ instructions that enable the operating system process 730 to respond to some user activity on the application's behalf. In some implementations, the application 740 declares external effects for certain UI elements, e.g., declaring that button X should show hover feedback but that button Y should not show hover feedback. An application 740 may use external effect declarations to specify the behavior that the application 740 intends for some or all of its UI elements. The application may provide a hierarchical declaration structure (e.g., an Apple® Core Animations® (CA) structure) that declares UI element positions, sizes, types, hierarchical relationships, transparent portions, layering effects, special effects, and/or any other information that facilitates the functions provided by the simulation system process 734 and/or the input support process 732. The application 740 may provide such information over an inter-process communication (or otherwise) to the operating system process 730.

The input support process 732 may use such information (e.g., application declarations of UI elements and/or external effects) to better interpret user activity. For example, a given gaze may be between two UI elements, one having external effects and the other not having external effects, and the input support process 732 may move/snap the gaze to the UI element that has the external effects since it is more likely to be the appropriate/intended UI element to which a UI response should be associated. External effects may be performed out of process without application 740 being involved.

In some implementations, an application 740 is enabled to request user permission for specified user data (e.g., detailed hands and/or detailed gaze data) and, if explicitly approved by the user, enabled to receive such information.

In various implementations, hands system 722 may produce different types of data including, but not limited to, timestamp data, joint position data, POV corrections (e.g., to joint positions), world transform data, joint confidence data, palm center data, palm normal direction data, hand action data, hand radius data, pinch data, object detection data (e.g., regarding an object held or touching the hand), and occlusion data, e.g., occlusion probability data regarding one joint being occluded and thus its data potentially less accurate. Similarly, in various implementations, the gaze system 724 may produce different types of data including, but not limited to, timestamp data, world transform data, binocular gaze data, gaze confidence data, gaze tracking state data, gaze direction data, gaze origin data, pupil center data, and pupil diameter data. In some implementations, the XR system includes a frame support module that enables better frame drop support via input frame queuing.

Input support process 732 may have access to rich and detailed hands data and gaze data and use that rich and detailed information to support accurate, efficient, and consistent input responses both within app processes and outside of app processes. However, it may be desirable to keep the details of such rich and detailed user data outside of applications, such as application 740, for example, to prevent such applications from knowing information about the user that the user considers private, e.g., what the user reads, which content they look at and for how long, how quickly the user reads, how big the user's hands/fingers are, hand skeleton bone lengths, missing digits, how the user interacts with other applications or aspects of the XR environment, etc.

In some implementations, an input support process 732 relies heavily upon a simulation system 734 to provide a geometric representation of a user interface for hit testing against hands and gaze data. An input support process 732 may use a collision world (e.g., 3D geometry abstractions) provided by a simulation system 734. An input support process 732 may use user interface priority information (e.g., hierarchical display ordering, transparency information, etc.). An input support process 732 may utilize a separate hit-testing process that produces 3D world hit test results (RE). An input support process 732 may utilize a hit testing process uses an application-provided hierarchical tree (e.g., declaring UI elements, relationships, and/or rendering information for example regarding what regions are transparent, rendered on top, etc.) to determine hits/UI element targets to associate with user activity.

In some implementations, the input support process may produce an interaction state for one or more UI elements, e.g., identifying whether an interaction is direct or indirect, whether an interaction is a hover/close proximity interaction (e.g., associated with user activity not linked to UI interaction behavior) or gesture/pinch/touch interaction (e.g., associated with user activity indicating UI intentional behavior).

In some implementations, an input support process 732 provides an interaction pose, e.g., a trajectory corrected point on a UI element configured to drive a touch-screen tap type of input. In some implementations, an input support process 732 provides an active target (e.g., UI element).

In some implementations, an input support process 732 provides manipulator pose, e.g., corresponding to a position and/or orientation of the hand itself. A manipulator pose may provide a 3D location of a stable hand center or pinch centroid. A manipulator pose may provide position and/or orientation of a manipulator driving the interaction, e.g., for direct touch interactions, providing the index fingertip information (e.g., location) and, for indirect pinch interactions, providing pinch information (e.g., pinch centroid).

In one example, a user initiates an interaction by pinching while gazing at a UI element. The application receives an interaction pose on the UI element and recognizes the user's intent to interact with the UI element. The user continues pinching and moves their hand to the left. The application receives more interaction poses, e.g., a set of positions on the user interface based on the moving 3D positions of the hand as it moves left, and responds by moving the associated UI element to the left. In this example, by pinching while gazing at a UI object and then moving the pinched hand to the left, the user provides input that the application can recognize to move the object to the left. The application is able to respond accordingly without needing to receive (and without actually receiving) information about the user's gaze directions and/or specific hand characteristics. In this example, the application receives only interaction pose data and thus may be an application capable of only receiving interaction pose data as a proxy for touch input data. The application may additionally or alternatively be provided with manipulator pose data, e.g., of the 3D positions of the hand as it moves left and may determine the motion of the associated object based on the changing manipulator pose position. The application may be provided with user change-based information, e.g., accelerated user-centric deltas providing delta-updates similar to a trackpad communicating the amount the user has moved from frame-to-frame, rather than an absolute position. Communicating changes, e.g., via a separate API, may helps us optimize one set of signals to accurately represent motion (e.g., for scrolling) separate from signals that also need to be absolute-position-accurate (e.g., for drawing).

In some implementations, an input support process 732 receives a gaze direction that could potentially be associated with different UI elements, e.g., because it is between the UI elements or because the UI elements overlap one another. Fuzzy hit testing and other such processes may help disambiguate user intention to identify an appropriate UI element in such cases.

In some implementations, an input support process 732 recognizes two-handed 3D gestures, e.g., a two-handed zoom gesture, and provides information to an application that corresponds to multi-touch touch screen input gestures. Doing so, for example, may involve generating an interaction pose for each hand that can be interpreted by an application's 2D touch-based gesture recognition processes as two touch points moving closer to or farther from one another, which may be interpreted as a pinch-to-zoom touch-screen gesture.

In some implementations, some applications may be enabled to render using custom rendering engines, e.g., straight to display hardware without utilizing OS rendering, and thus provide limited UI element information for input support process 732 to use to support input recognition processes. Such applications may be authorized to use an API that enables the applications to use filtered hands data (e.g., with upsampling, POVc, etc.) and at the movement of an intentional interaction, e.g., during a pinch, a single gaze ray is provided to the applications. Doing so may enable some custom application input recognition while still protecting most of the user's gaze direction data. The applications do not receive continuous gaze direction data in this example. Such a framework may be appropriate, for example, for applications being migrated from another 3D XR framework that already include 3D recognition capabilities built into the apps, e.g., enabling use of such apps with little or no modification while still protecting user privacy.

In some implementations, an application is developed for use on a mobile platform that uses single and/or multi-touch input gestures. The application may be developed by the application developer including calls to a gesture API and then specifying what to do on certain types of touch events, e.g., do X on a tap event, Y on a swipe event, etc. It may be desirable to use such applications on a new or different platform that offers input modalities different than (or in addition to) single and/or multi-touch input gestures. Rather than implementing all new 3D gestures and gesture recognition processes within the application, some implementations disclosed herein interpret 3D user activity (e.g., hand positions, gaze directions, etc.) and send proxy data to the application corresponding to where a touch would be if the 3D user activity had been performed as a 2D touch input gesture. Input support process 732 may provide such proxy data to such applications and, in doing so, enable a large universe of existing 2D/touch-based applications to be easily imported and used within a new 3D system that uses new and different 3D user activity-based inputs. Input support process 732 may make additional information available so that newer/modified applications can take advantage/use more information about the user's 3D activity. Alternatively, this information may be leveraged by an old unmodified application that is linking against XR-compatible versions of UI frameworks, which can under-the-hood take advantage of this extra data on the app's behalf (e.g., a binary compatible app using a standard long press recognizer can benefit from an XR-based OS implementation that uses z-depth of the touch to more accurately recognize long press than a native 2D-only approach).

In some implementations, to enable use of both legacy 2D/touch-based applications and newer applications with additional, 3D recognition capabilities, the input support process may provide multiple types of information, e.g., interaction pose data to support touch-based input recognition by a legacy application as well as manipulator pose data to support applications with additional, 3D recognition capabilities.

Interpreting 3D user activity as 2D touch-based activity can require overcoming various challenges. For example, a user's hand movement in 3D space when performing a touch gesture may be equated with a touch-screen tap gesture but may lack the precision expected for a touch-screen tap gesture. A touch on a touch screen involves contact with a physical surface that stops the finger while a motion "virtually" touching a UI in a 3D XR environment may involve the user's hand poking through the UI element. A user may intend to tap the surface of a virtual button but actually poke through the surface at one position and then retract the hand/finger at a slightly different position. This user activity involving two different UI element positions can be interpreted (by an input support process) as a tap at a single point using various algorithms and/or machine learning processes, e.g., performing a trajectory correction. The application receives the single location (from the input support process) and recognizes it as a touch event. Thus, the input support process 732 may classify and/or interpret user activity to account for unique circumstances of interacting within a 3D environment and package the data provided to the application so that the application does not need to itself distinguish between the action intended by the user and the action actually performed by the user.

The input support process 732 may account for sensor inaccuracy/limitations, e.g., accounting for the fact that gaze direction that are identified may differ from actual gaze directions, in providing data to applications. The applications need not account for such inaccuracies themselves.

In formatting the data for the application in a format that the application will understand, the input support process 732 can resolve ambiguities, account for inaccuracies, and/or repackage input provided in an input modality that the application does not/need not itself understand into a format that the application does recognize.

In short, the input support process 732 may perform various processes that interpret raw 3D data for consumption by applications so that the applications (and their developers) need not perform those processes via manually-programmed processes. Additionally, performing such processes by a shared OS process can unify the input experience across all apps so that users receive consistent UI response behavior.

Moreover, a shared input support process 732 may enable multiple interaction modalities, e.g., that provide different ways of a user selecting a button, and abstract the user activity data associated with those different modalities for the same types of interactions to provide that same data to the application for different types of input. The input modalities can thus be changed and/or added to over time without requiring changes to the applications, so long as the input support process 732 can abstract the new or changed input modality user activities to the format understood by the applications.

In some implementations, an application utilizes a gesture recognizer that runs within the application process. The gesture recognizer may include a state machine that classifies inputs that are received in a stream of input data, e.g., a tap has started, a tap is ongoing, a tap has ended. An input support process 732 may provide data to the application that are recognized by the gesture recognizer running within the application process as particular types of input, e.g., taps, that may correspond to a single input modality specific to the application, e.g., a touch-based input modality. The input support process 732 may configure the data provided to the application to ensure that the application's process recognizes the user activity accurately, e.g., by the provided data in a form that the gesture recognizer expects. In one example, the input support process 732 converts user activity involving a user gaze and a hand gesture to data that can be recognized as touch input. In another example, the input support process 732 converts user activity involve a 6DOF controller and a gaze to data that can be recognized as touch input.

An application developer need not write an application for different input modality platforms. Rather an application developer can write an application for a touch platform (or a generic 2D input modality) and the application may be imported with little or no effort to work within a 3D user activity platform. A single application may be used on mobile devices, laptop devices, tablet devices, desktop devices, and 3D XR devices. The techniques disclosed here can enable binary compatibility, i.e., an application being executable in different environments that utilize different input modalities.

In some implementations, an input support process 732 provides a gesture flag and/or gesture classification to an application, e.g., indicating to the application that the user has raised their hand or recognizing that a particular gesture is a tap, swipe, scroll, etc. as a hint that the application (or UI framework) can use in recognizing the gesture.

In some implementations, an input support process 732 facilitates an application recognizing gaze-only input without providing raw gaze data to the application. This may involve periodically provide gaze data (i.e., the location on a UI element that the user is gazing at). Gaze-only data may be associated with an interaction state and data provided to the applications based on gaze-only data only when the gaze data is associated with a particular interaction state, e.g., providing data when a gaze-hover state is applicable. Such data may be provided only based on express user authorization. For example, when a user stares at a UI element for more than a threshold amount of time the application may be notified and an affordance may be displayed (e.g., a dot). If the user then looks at the affordance, the application may be notified that the stared at UI element has been hit/selected. In another example, a stare at a point within a UI element for more than a threshold amount of time may trigger a hover feedback, which may be handled out of process or by the application. A gaze-only input modality may be another input modality that is abstracted into data provided to an application such that the application can interpret the input, e.g., using a generic or touch-based gesture recognition process.

In some implementations, an input support process determines an interaction state for each hand (e.g., direct versus indirect) and/or an interaction state associated with a user gaze (e.g., gaze only or not gaze only).

FIG. 8 is a flowchart illustrating a method 800 for supporting application input recognition based on activity data associated with two hands, in accordance with some implementations. In some implementations, a device such as electronic device 105 or electronic device 110 performs method 800. In some implementations, method 800 is performed on a mobile device, desktop, laptop, HMD, or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 receives data corresponding to user activity involving two hands of a user in a 3D coordinate system. The data corresponding to user activity involving two hands may include sensor data that may be used to determine when to initiate hand tracking (e.g., when a user pinches) and a location of the hand during the tracking (e.g., to track velocity and/or track UCM of one or more points associated with the hand, wrist, or arm of the user). In some implementations, the method 800 obtains the sensor data associated with multiple portions of a hand via a sensor in a physical environment for a period of time. In some implementations, the sensor data may include user interface position data. For example, the sensor data may be associated with a position and/or an orientation of a head of a user. Additionally, or alternatively, the sensor data may be associated with a position and/or an orientation of a device worn on a head of the user, such as an HMD (e.g., device 105), and the sensor data may be obtained from outward facing cameras and/or depth sensor data. In some implementations, the data corresponding to user activity involving two hands may include hand model data (e.g., skeleton representation(s)) representing the 3D configurations, 3D positions, and 3D movements of the user's hands as determined based on sensor data.

In some implementations, the data may include RGB data, lidar-based depth data, and/or densified depth data. For example, sensors on a device (e.g., camera's, IMU, etc. on device 110) can capture information about the position, location, motion, pose, etc., of the head and/or body of the user 102, including tracking positions of the multiple portions of a hand. In some implementations, the user activity includes at least one of a hand position, a hand movement, an eye position, or a gaze direction.

In some implementations, the data includes multiple sensor data signals. For example, one of the multiple sensor data signals may be an image signal, one of the multiple sensor data signals may be a depth signal (e.g., a structured light, a time-of-flight, or the like), one of the multiple sensor data signals may be a device motion signal (e.g., an accelerometer, an inertial measurement unit (IMU) or other tracking systems), and the like. In some implementations, the data may include at least one or data signals that include light intensity image data, depth data, user interface position data, and motion data, or a combination thereof.

At block 804, the method 800 determines gestures performed by the two hands based on the data corresponding to the user activity. For example, the gestures performed by one or both hands may be interpreted as to whether one or both hands have pinched and when they pinched (e.g., triggering two-handed gestures vs one-handed gestures).

In some implementations, the user activity is determined to provide a single-handed gesture (e.g., a pinch). In some implementations, the user activity is determined to provide a dual-handed gesture (e.g., a two-handed zoom or pan).

At block 806, the method 800 identifies actions performed by the two hands based on the determined gestures, each of the two hands performing one of the identified actions. For example, the identified actions may include pan, zoom, rotate gestures, and the like. In some implementations, if the system determines there is a two-handed gesture, then the system may determine whether the user is zooming, panning, or rotating, etc. based on the initial movement and/or what the user is looking at and/or what gesture is allowed by the application the user is interacting with.

At block 808, the method 800 determines whether the identified actions satisfy a criterion (e.g., suppression criteria) based on the data corresponding to the user activity. For example, pan suppression criterion may be utilized to determine hand velocity and components of pan delta with respect to zoom delta in order to determine whether or not to suppress the component of pan delta orthogonal to the zoom direction. For example, as illustrated in FIGS. 4A-4B, if the system detects the motion away or towards from each other, the system may suppress the component, and if both hands are moving the same direction, the system may limit or avoid suppression all-together. For example, unintentional pan may be reduced when it is determined that a user is intending to perform a zoom.

In some implementations, determining whether the identified actions satisfy the criterion based on the data corresponding to the user activity includes determining a velocity of movement of the two hands, and determining, based on the velocity of movement of the two hands, whether the two hands are moving away or towards each other or if the two hands satisfy a same direction criterion. For example, the system may determine hand velocity and components of pan delta with respect to zoom delta and apply a pan suppression rule. For example, the pan suppression rule may include if the hands are moving away or towards each other, the system may suppress the component of pan delta orthogonal to the zoom direction.

In some implementations, in response to determining that the two hands are moving away or towards each other, applying a suppression of a determined component of the movement of the two hands for determining a user intended action. Additionally, or alternatively, in some implementations, in response to determining that the two hands satisfy the same direction criterion, applying a limitation of a suppression of a determined component of the movement of the two hands for determining a user intended action. For example, the pan suppression rule may include if the system detects the hand motion away or towards from each other, the system may suppress the component, and if both hands are moving the same direction, the system limit or avoid suppression all-together. In some implementations, the limitation of the suppression of the determined component of the movement of the two hands may be based on a weighted scale. For example, suppression could be implemented via a weighted scale factor to reduce magnitude, or using a dead-band, e.g., suppressing it only up to a threshold amount of movement.

In some implementations, determining whether the identified actions satisfy the criterion is based on determining whether the user activity includes motion associated with a pan motion, a zoom motion, a rotation motion, or a combination thereof. For example, the system may decompose what motion is due to pan, what motion is due to zoom, etc., without having to aggressively suppress everything that moves along the zoom component and instead just suppress the particular piece due to the zoom.

At block 810, the method 800 determines to associate each of the actions performed by each of the two hands with a user intended action in accordance with determining that the identified actions satisfy the criterion. For example, the system may implement the identified user intended actions that may include a pan interaction, a zoom interaction, a rotation of one or more elements of a user interface, and the like, with the identified suppression criteria applied.

In some implementations, determining the user intended action includes determining that the user activity is associated with two simultaneous two-handed gestures. For example, the system may implement both a pan and zoom of a user interface element at the same time.

In some implementations, determining the user intended action includes determining that the user activity is associated with simultaneous one-handed gestures. For example, in which each hand (e.g., left/right) simultaneously performs an independent gesture, such as a pinch in the left hand, and a point and/or pan motion with the right hand may select a user interface icon based on the pinch of the left hand, and then move or pan the content selected with the pan motion of the right hand.

In some implementations, the method 800 further includes using at least a portion of the identified actions performed by the two hands to directly enable a functional component displayed within an extended reality (XR) environment. For example, the system may perform the determined pan, zoom, rotate, or a combination of movements, and the like. In some implementations, the method 800 is performed by an electronic device that is a head-mounted device (HMD) and/or the XR environment is a virtual reality environment or an augmented reality environment.

The method 800 may display a view of an extended reality (XR) environment corresponding to a 3D coordinate system, where the UI elements of the application are displayed in the view of the XR environment. Such an XR environment may include UI elements from multiple application processes corresponding to multiple applications and the input support process may identify the interaction event data for the multiple applications and route interaction event data to only the appropriate applications, e.g., the applications to which the interactions are intended by the user. Accurately routing data to only the intended applications may help ensure that one application does to misuse input data intended for another application (e.g., one application does not track a user entering a password into another application).

Figure 9:
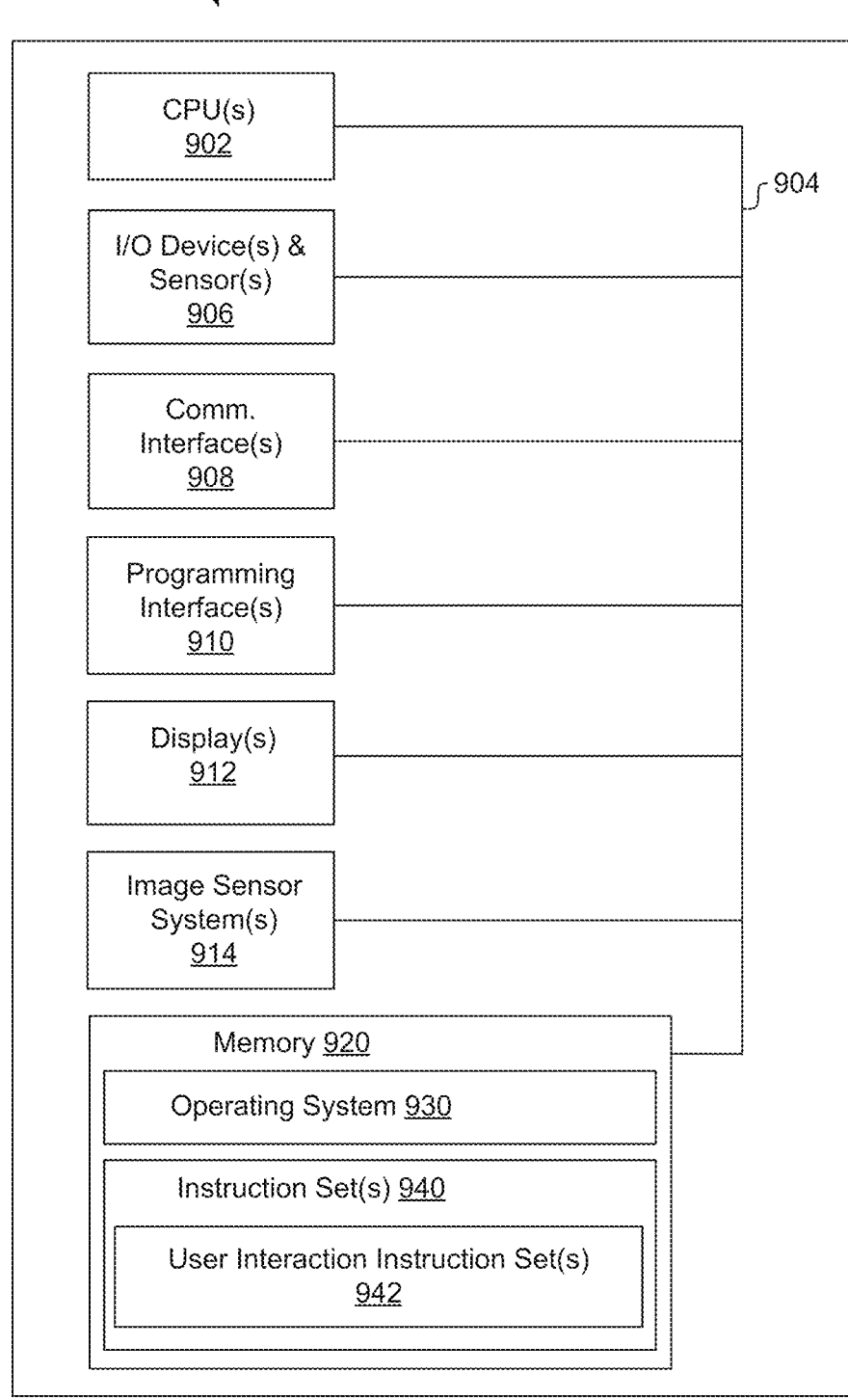
FIG. 9 is a block diagram of an electronic device in accordance with some implementations.

FIG. 9 is a block diagram of electronic device 900. Device 900 illustrates an exemplary device configuration for electronic device 110 or electronic device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUS, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 910, one or more output device(s) 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 912 include one or more displays configured to present a view of a 3D environment to the user. In some implementations, the one or more output devices 912 (e.g., displays) correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 900 includes a single display. In another example, the device 900 includes a display for each eye of the user.

In some implementations, the one or more output device(s) 912 include one or more audio producing devices.

In some implementations, the one or more output device(s) 912 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 912 may additionally or alternatively be configured to generate haptics.

In some implementations, the one or more image sensor systems 914 are configured to obtain image data that corresponds to at least a portion of a physical environment. For example, the one or more image sensor systems 914 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include user interaction instruction set(s) 942 configured to, upon execution, identify and/or interpret user gestures (e.g., two handed gestures) and other user activities as described herein. The instruction set(s) 940 include user interaction set(s) 942 for one or more applications. In some implementations, each of the applications is provided for as a separately-executing set of code, e.g., capable of being executed via an application process. The instruction set(s) 940 may be embodied as a single software executable or multiple software executables.

Although the instruction set(s) 940 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 10:
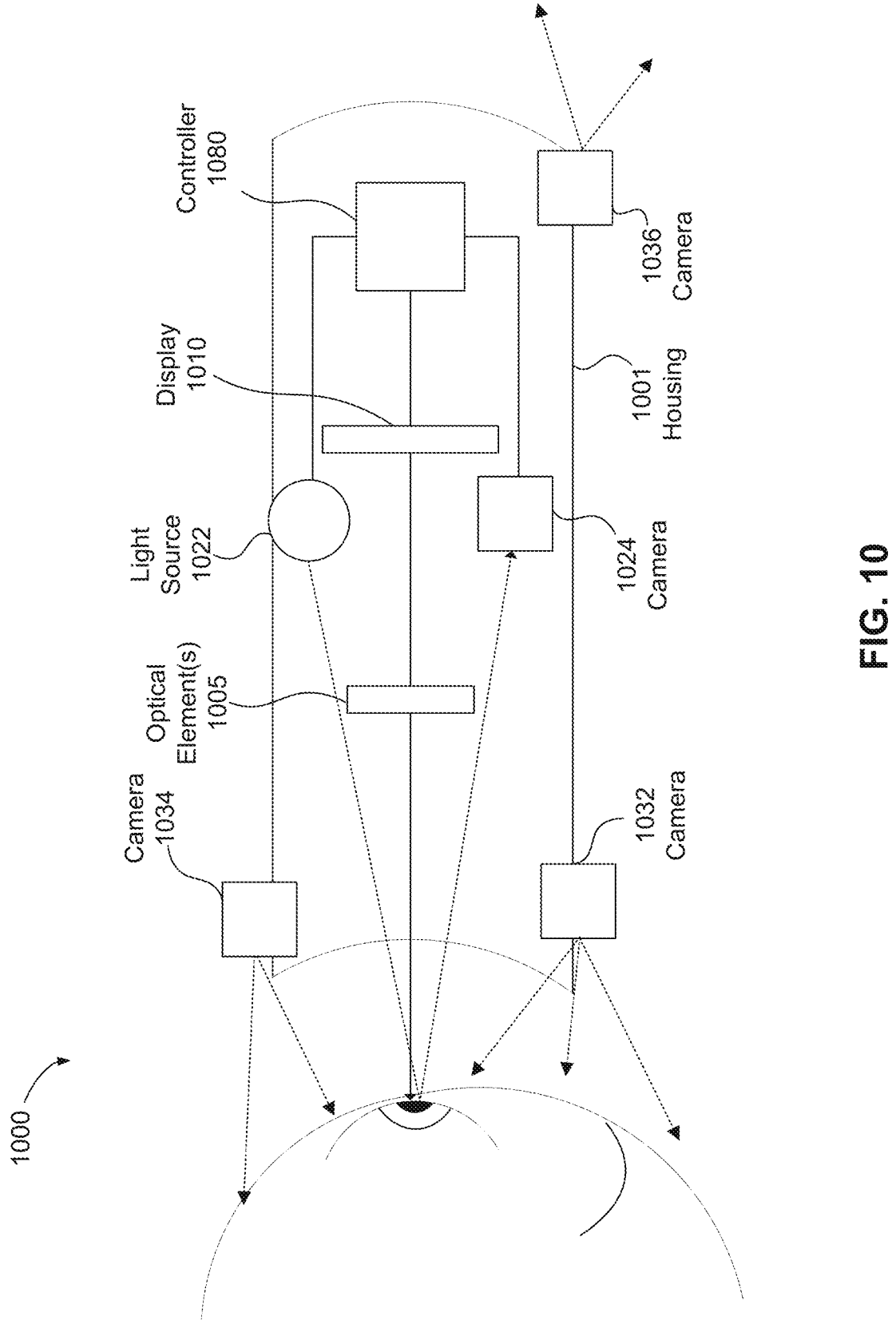
FIG. 10 is a block diagram of an exemplary head-mounted device in accordance with some implementations.

FIG. 10 illustrates a block diagram of an exemplary head-mounted device 1000 in accordance with some implementations. The head-mounted device 1000 includes a housing 1001 (or enclosure) that houses various components of the head-mounted device 1000. The housing 1001 includes (or is coupled to) an eye pad (not shown) disposed at a proximal (to the user 102) end of the housing 1001. In various implementations, the eye pad is a plastic or rubber piece that comfortably and snugly keeps the head-mounted device 1000 in the proper position on the face of the user 102 (e.g., surrounding the eye of the user 102).

The housing 1001 houses a display 1010 that displays an image, emitting light towards or onto the eye of a user 102. In various implementations, the display 1010 emits the light through an eyepiece having one or more optical elements 1005 that refracts the light emitted by the display 1010, making the display appear to the user 102 to be at a virtual distance farther than the actual distance from the eye to the display 1010. For example, optical element(s) 1005 may include one or more lenses, a waveguide, other diffraction optical elements (DOE), and the like. For the user 102 to be able to focus on the display 1010, in various implementations, the virtual distance is at least greater than a minimum focal distance of the eye (e.g., 7 cm). Further, in order to provide a better user experience, in various implementations, the virtual distance is greater than 1 meter.

The housing 1001 also houses a tracking system including one or more light sources 1022, camera 1024, camera 1032, camera 1034, camera 1036, and a controller 1080. The one or more light sources 1022 emit light onto the eye of the user 102 that reflects as a light pattern (e.g., a circle of glints) that may be detected by the camera 1024. Based on the light pattern, the controller 1080 may determine an eye tracking characteristic of the user 102. For example, the controller 1080 may determine a gaze direction and/or a blinking state (eyes open or eyes closed) of the user 102. As another example, the controller 1080 may determine a pupil center, a pupil size, or a point of regard. Thus, in various implementations, the light is emitted by the one or more light sources 1022, reflects off the eye of the user 102, and is detected by the camera 1024. In various implementations, the light from the eye of the user 102 is reflected off a hot mirror or passed through an eyepiece before reaching the camera 1024.

The display 1010 emits light in a first wavelength range and the one or more light sources 1022 emit light in a second wavelength range. Similarly, the camera 1024 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 1010 by looking at it), provide foveated rendering (e.g., present a higher resolution in an area of the display 1010 the user 102 is looking at and a lower resolution elsewhere on the display 1010), or correct distortions (e.g., for images to be provided on the display 1010).

In various implementations, the one or more light sources 1022 emit light towards the eye of the user 102 which reflects in the form of a plurality of glints.

In various implementations, the camera 1024 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1024 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 1032, camera 1034, and camera 1036 are frame/shutter-based cameras that, at a particular point in time or multiple points in time at a frame rate, may generate an image of the face of the user 102 or capture an external physical environment. For example, camera 1032 captures images of the user's face below the eyes, camera 1034 captures images of the user's face above the eyes, and camera 1036 captures the external environment of the user (e.g., environment 100 of FIG. 1). The images captured by camera 1032, camera 1034, and camera 1036 may include light intensity images (e.g., RGB) and/or depth image data (e.g., Time-of-Flight, infrared, etc.).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device having a processor and one or more sensors:
receiving data corresponding to user activity involving two hands of a user in a 3D coordinate system;
determining one or more gestures performed by the two hands based on the data corresponding to the user activity;
identifying actions performed by the two hands based on the determined one or more gestures, each of the two hands performing one of the identified actions;
determining a delta corresponding to coordinate differences between the two hands based on tracking each hand during the user activity;
decomposing the delta into a plurality of components of a motion; and
suppressing a component of the plurality of components of the decomposed delta associated with movement outside of the identified actions in order to interpret the user activity.

2. The method of claim 1, wherein the user activity is determined to provide a single-handed gesture.

3. The method of claim 1, wherein the user activity is determined to provide a dual-handed gesture.

4. The method of claim 1, wherein the identified action comprises a pan interaction, a zoom interaction, or a rotation of one or more elements of a user interface.

5. The method of claim 1, wherein identifying actions performed by the two hands comprises:

determining a velocity of movement of the two hands; and
determining, based on the velocity of movement of the two hands, whether the two hands are moving away or towards each other or if the two hands satisfy a same direction criterion.

6. The method of claim 5, wherein, in response to determining that the two hands are moving away or towards each other, applying a suppression of a determined component of the movement of the two hands for determining a user intended action.

7. The method of claim 5, wherein, in response to determining that the two hands satisfy the same direction criterion, applying a limitation of a suppression of a determined component of the movement of the two hands for determining a user intended action.

8. The method of claim 7, wherein the limitation of the suppression of the determined component of the movement of the two hands is based on a weighted scale.

9. The method of claim 1, wherein identifying actions performed by the two hands is based on determining whether the user activity comprises motion associated with a pan motion, a zoom motion, a rotation motion, or a combination thereof.

10. The method of claim 1, wherein determining the identified action comprises determining that the user activity is associated with two simultaneous two-handed gestures.

11. The method of claim 1, wherein determining the identified action comprises determining that the user activity is associated with simultaneous one-handed gestures.

12. The method of claim 1, further comprising:
using at least a portion of the identified actions performed by the two hands to directly enable a functional component displayed within an extended reality (XR) environment.

13. The method of claim 1, wherein suppressing the component of the plurality of components of the decomposed delta associated with movement outside of the identified actions in order to interpret the user activity comprises applying a suppression of a particular movement component based on the identified action associated with the movement of the two hands.

14. The method of claim 1, further comprising:
interpreting user input based on the suppressing the component of the plurality of components of the decomposed delta associated with movement outside of the identified actions.

15. A device comprising:
one or more sensors;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
receiving data corresponding to user activity involving two hands of a user in a 3D coordinate system;
determining one or more gestures performed by the two hands based on the data corresponding to the user activity;
identifying actions performed by the two hands based on the determined one or more gestures, each of the two hands performing one of the identified actions;
determining a delta corresponding to coordinate differences between the two hands based on tracking each hand during the user activity;
decomposing the delta into a plurality of components of a motion; and suppressing a component of the plurality of components of the decomposed delta associated with movement outside of the identified actions in order to interpret the user activity.

16. The device of claim 15, wherein the user activity is determined to provide a single-handed gesture.

17. The device of claim 15, wherein the user activity is determined to provide a dual-handed gesture.

18. The device of claim 15, wherein the identified action comprises a pan interaction, a zoom interaction, or a rotation of one or more elements of a user interface.

19. The device of claim 15, wherein identifying actions performed by the two hands comprises:

determining a velocity of movement of the two hands; and determining, based on the velocity of movement of the two hands, whether the two hands are moving away or towards each other or if the two hands satisfy a same direction criterion.

20. The device of claim 19, wherein, in response to determining that the two hands are moving away or towards each other, applying a suppression of a determined component of the movement of the two hands for determining a user intended action.

21. The device of claim 19, wherein, in response to determining that the two hands satisfy the same direction criterion, applying a limitation of a suppression of a determined component of the movement of the two hands for determining a user intended action.

22. A non-transitory computer-readable storage medium, storing program instructions executable on a device to perform operations comprising:

receiving data corresponding to user activity involving two hands of a user in a 3D coordinate system;

determining one or more gestures performed by the two hands based on the data corresponding to the user activity;

identifying actions performed by the two hands based on the determined one or more gestures, each of the two hands performing one of the identified actions;

determining a delta corresponding to coordinate differences between the two hands based on tracking each hand during the user activity;

decomposing the delta into a plurality of components of a motion; and suppressing a component of the plurality of components of the decomposed delta associated with movement outside of the identified actions in order to interpret the user activity.

* * * * *